United States Patent
Hu et al.

(10) Patent No.: US 12,452,877 B2
(45) Date of Patent: Oct. 21, 2025

(54) UPLINK TRANSMISSION METHOD AND COMMUNICATION APPARATUS

(71) Applicant: HUAWEI TECHNOLOGIES CO., LTD., Shenzhen (CN)

(72) Inventors: Dan Hu, Beijing (CN); Xu Zhang, Beijing (CN); Bingyu Qu, Beijing (CN); Feng Wang, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 275 days.

(21) Appl. No.: 18/307,167

(22) Filed: Apr. 26, 2023

(65) Prior Publication Data
US 2023/0276453 A1    Aug. 31, 2023

Related U.S. Application Data

(63) Continuation of application No. PCT/CN2020/124564, filed on Oct. 28, 2020.

(51) Int. Cl.
*H04W 72/23* (2023.01)
*H04L 5/00* (2006.01)

(52) U.S. Cl.
CPC ........... *H04W 72/23* (2023.01); *H04L 5/0092* (2013.01)

(58) Field of Classification Search
CPC .... H04W 72/23; H04L 5/0092; H04L 5/0044; H04L 5/0094; H04L 5/001
See application file for complete search history.

(56) References Cited

U.S. PATENT DOCUMENTS

| | | | | |
|---|---|---|---|---|
| 8,606,257 | B2* | 12/2013 | Li | H04W 8/22 455/450 |
| 9,338,695 | B2* | 5/2016 | Kitazoe | H04L 5/001 |
| 2015/0327269 | A1* | 11/2015 | Kim | H04W 8/24 370/329 |

FOREIGN PATENT DOCUMENTS

| | | |
|---|---|---|
| CN | 110381576 A | 10/2019 |
| CN | 110391883 A | 10/2019 |
| CN | 110557821 A | 12/2019 |
| WO | 2019028892 A1 | 2/2019 |
| WO | 2019137342 A1 | 7/2019 |
| WO | 2019244735 A1 | 12/2019 |
| WO | 2020030974 A2 | 2/2020 |

OTHER PUBLICATIONS

Yu, Changsheng, et al. "Uplink scheduling and link adaptation for narrowband Internet of Things systems." IEEE Access 5 (2017): 1724-1734. (Year: 2017).*
Extended European Search Report issued in corresponding European Application No. 20959094.2, dated Oct. 26, 2023, pp. 1-9.

(Continued)

*Primary Examiner* — Sharad Rampuria
(74) *Attorney, Agent, or Firm* — Hauptman Ham, LLP

(57) ABSTRACT

An uplink transmission method and a communication apparatus. A terminal device receives first indication information indicating at least two uplink carriers to effectively reduce control signaling overheads. The terminal device sends uplink transmission on the at least two uplink carriers based on the first indication information. The uplink transmission is sent on the at least two uplink carriers in response to control signaling overheads being reduced. The use of the at least two uplink carriers increases an uplink capacity.

12 Claims, 7 Drawing Sheets

(56) References Cited

OTHER PUBLICATIONS

International Search Report issued in corresponding International Application No. PCT/CN2020/124564, dated Jul. 26, 2021, pp. 1-9.
European Office Action issued in corresponding European Application No. 20959094.2, dated Feb. 28, 2025, pp. 1-6.

* cited by examiner

UPLINK TRANSMISSION METHOD AND COMMUNICATION APPARATUS

CROSS-REFERENCE TO RELATED APPLICATION S

This application is a continuation of International Application No. PCT/CN2020/124564, filed on Oct. 28, 2020, the disclosure of which is hereby incorporated by reference in its entirety.

BACKGROUND

The International Telecommunication Union (international telecommunication union, ITU) defines three types of application scenarios for 5G and future communication systems: enhanced mobile broadband (enhanced mobile broadband, eMBB), ultra-reliable low-latency communication (Ultra-reliable low-latency communication, URLLC), and massive machine-type communications (massive machine-type communications, mMTC).

Services whose application scenario is the eMBB may include an ultra high-definition video, augmented reality (augmented reality, AR), virtual reality (virtual reality, VR), and the like. These services are mainly characterized by a large amount of transmitted data and a very high transmission rate. Services whose application scenario is the URLLC may include tactile interactive application s such as wireless control in an industrial manufacturing or production process, motion control of an unmanned vehicle and an unmanned aircraft, remote repair, and remote surgery. These services are mainly characterized by ultra-high reliability, a low latency, a small amount of transmitted data, and burstiness. Services whose application scenario is the mMTC may include power distribution automation of a smart grid, a smart city, and the like. These services are characterized by a huge number of mMTC terminals, a small amount of transmitted data, and insensitivity of data to a transmission delay. These mMTC terminals need to meet requirements for low costs and very long standby time.

With growing requirements for high user-experienced rates, ultimate peak rates, massive and ultra-reliable low-latency communication, how to improve utilization of spectrum bandwidth in a 5G communication network becomes an urgent problem to be resolved.

SUMMARY

Embodiments described herein provide an uplink transmission method and a communication apparatus, to improve utilization of spectrum bandwidth in a 5G communication network.

To achieve the foregoing objective, the following technical solutions are used in embodiments described herein.

According to a first aspect, at least one embodiment provides an uplink transmission method. The method is performed by a terminal device, or is performed by a chip disposed in the terminal device. The following provides descriptions by using an example in which the method is performed by the terminal device. The method includes: The terminal device receives first indication information, where the first indication information indicates at least two uplink carriers. The terminal device sends uplink transmission on the at least two uplink carriers based on the first indication information.

In this way, at least one embodiment provides an uplink transmission method. In the method, the terminal device receives the first indication information, and the first indication information indicates the at least two uplink carriers, to effectively reduce control signaling overheads. In addition, the terminal device sends uplink transmission on the at least two uplink carriers based on the first indication information, so that the terminal device sends the uplink transmission on a plurality of uplink carriers. Therefore, in at least one embodiment, the uplink transmission is sent on the plurality of uplink carriers in response to control signaling overheads being reduced, so that an objective of using a plurality of uplink spectrum resources to increase an uplink capacity is achieved.

With reference to the first aspect, in an implementation, the first indication information further indicates M first resources or N first resource sets on the at least two uplink carriers, M is a positive integer greater than or equal to 2, and N is a positive integer greater than or equal to 1. The terminal device determines, based on the M first resources or the N first resource sets, first precoding used for data sending.

With reference to the first aspect, in an implementation, the at least two uplink carriers include a first uplink carrier and a second uplink carrier. The M first resources or the N first resource sets include P first resources on the first uplink carrier and Q first resources on the second uplink carrier, where both P and Q are positive integers greater than or equal to 1.

In this way, a network device configures the M first resources or the N first resource sets for the terminal device. The M first resources are any combination of first resources on the at least two uplink carriers, and the N first resource sets are sets of any combination of the first resources on the at least two uplink carriers. This ensures that the terminal device freely selects a first resource combination, and a transmit capability of the terminal device is fully utilized.

With reference to the first aspect, in an implementation, the at least two uplink carriers include a first uplink carrier and a second uplink carrier. The first indication information further indicates first precoding used for data sending, and the first precoding includes precoding that is used for data sending and that is on the first uplink carrier and precoding that is used for data sending and that is on the second uplink carrier.

With reference to the first aspect, in an implementation, the first indication information further indicates a number of transmission layers corresponding to uplink transmission. A number of transmission layers corresponding to the first precoding is a sum of a number of transmission layers for uplink transmission on the first uplink carrier and a number of transmission layers for uplink transmission on the second uplink carrier.

In this way, the terminal device obtains precoding information on the at least two uplink carriers by receiving a single piece of indication information, so that uplink transmission is simultaneously performed on the at least two uplink carriers. This reduces signaling detection overheads and power consumption of the terminal device.

With reference to the first aspect, in an implementation, the uplink transmission includes first uplink transmission and/or second uplink transmission. That the terminal device sends uplink transmission on the at least two uplink carriers based on the first indication information is specifically as follows: The terminal device sends the first uplink transmission on the at least two uplink carriers based on the first indication information; or the terminal device sends, based on the first indication information, the first uplink transmission on a first uplink carrier of the at least two uplink carriers, and sends the second uplink transmission on a second uplink carrier of the at least two uplink carriers.

With reference to the first aspect, in an implementation, the first indication information further includes a first power parameter and a second power parameter. The first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

In this way, the terminal device performs uplink transmission on the at least two uplink carriers by using different power control parameters. This avoids a problem that determining of a transmission power of the uplink transmission is affected because different maximum power reductions MPRs are caused by different frequency domain resource allocations on the two uplink carriers.

With reference to the first aspect, in an implementation, the at least two uplink carriers are in at least one of the following cases: at least one supplementary uplink SUL carrier and at least one non-SUL carrier; at least two uplink carriers used for uplink carrier aggregation; at least two uplink carriers used for dual connectivity; SUL carriers; and consecutive uplink carriers.

According to a second aspect, at least one embodiment provides an uplink transmission method. The method is performed by a network device, or is performed by a chip disposed in the network device. The following provides descriptions by using an example in which the method is performed by the network device. The method includes: The network device determines at least two uplink carriers. The network device sends first indication information to a terminal device, where the first indication information indicates the terminal device to send uplink transmission on the at least two uplink carriers.

In this way, at least one embodiment provides the uplink transmission method. In the method, the network device sends the first indication information, to indicate the terminal device to send the uplink transmission on the at least two uplink carriers, to effectively reduce control signaling overheads.

With reference to the second aspect, in an implementation, the first indication information further indicates the terminal device to determine, based on M first resources or N first resource sets on the at least two uplink carriers, first precoding used for data sending, where M is a positive integer greater than or equal to 2, and N is a positive integer greater than or equal to 1.

With reference to the second aspect, in an implementation, the at least two uplink carriers include a first uplink carrier and a second uplink carrier. The M first resources or the N first resource sets include P first resources on the first uplink carrier and Q first resources on the second uplink carrier, where both P and Q are integers greater than or equal to 1.

In this way, a network device configures the M first resources or the N first resource sets for the terminal device. The M resources are any combination of first resources on the at least two uplink carriers, and the N first resource sets are sets of any combination of the first resources on the at least two uplink carriers. This ensures that the terminal device freely selects a first resource combination, and a transmit capability of the terminal device is fully utilized.

With reference to the second aspect, in an implementation, the at least two uplink carriers include a first uplink carrier and a second uplink carrier. The first indication information further indicates first precoding used for data sending, and the first precoding includes precoding that is used for data sending and that is on the first uplink carrier and precoding that is used for data sending and that is on the second uplink carrier.

In this way, the network device jointly schedules precoding information on the at least two uplink carriers by receiving a single piece of indication information, so that simultaneous scheduling of the uplink transmission is performed on the at least two uplink carriers. This improves transmission performance.

With reference to the second aspect, in an implementation, the first indication information further indicates a number of transmission layers corresponding to uplink transmission. A number of transmission layers corresponding to the first precoding is a sum of a number of transmission layers for uplink transmission on the first uplink carrier and a number of transmission layers for uplink transmission on the second uplink carrier.

With reference to the second aspect, in an implementation, the first indication information further includes a first power parameter and a second power parameter. The first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

With reference to the second aspect, in an implementation, the at least two uplink carriers are in at least one of the following cases: at least one supplementary uplink SUL carrier and at least one non-SUL carrier; at least two uplink carriers used for uplink carrier aggregation; at least two uplink carriers used for dual connectivity; supplementary uplink SUL carriers; and consecutive uplink carriers.

According to a third aspect, at least one embodiment provides a communication apparatus. The communication apparatus is the terminal device in the first aspect, or an electronic device disposed in the terminal device, or a large device including the terminal device. The communication apparatus includes: a receiving unit, configured to receive first indication information, where the first indication information indicates at least two uplink carriers; and a sending unit, configured to send uplink transmission on the at least two uplink carriers based on the first indication information.

In this way, at least one embodiment provides the communication apparatus. The communication apparatus receives the first indication information, and sends the uplink transmission on the at least two uplink carriers based on the first indication information, so that the communication apparatus sends the uplink transmission on a plurality of uplink carriers. This effectively reduces control signaling overheads.

With reference to the third aspect, in an implementation, the first indication information further indicates M first resources or N first resource sets on the at least two uplink carriers, M is a positive integer greater than or equal to 2, and N is a positive integer greater than or equal to 1. The terminal device further includes: a processing unit, configured to determine, based on the M first resources or the N first resource sets, first precoding used for data sending.

With reference to the third aspect, in an implementation, the at least two uplink carriers include a first uplink carrier and a second uplink carrier. The M first resources or the N first resource sets include P first resources on the first uplink carrier and Q first resources on the second uplink carrier, where both P and Q are integers greater than or equal to 1.

In this way, the network device configures the M first resources or the N first resource sets for the communication device. The M resources are any combination of first resources on the at least two uplink carriers, and the N first resource sets are sets of any combination of the first resources on the at least two uplink carriers. This ensures that the terminal device freely selects a first resource combination, and a transmit capability of the communication device is fully utilized.

With reference to the third aspect, in an implementation, the at least two uplink carriers include a first uplink carrier and a second uplink carrier. The first indication information further indicates first precoding used for data sending, and the first precoding includes precoding that is used for data sending and that is on the first uplink carrier and precoding that is used for data sending and that is on the second uplink carrier.

With reference to the third aspect, in an implementation, the first indication information further indicates a number of transmission layers corresponding to uplink transmission. A number of transmission layers corresponding to the first precoding is a sum of a number of transmission layers for uplink transmission on the first uplink carrier and a number of transmission layers for uplink transmission on the second uplink carrier.

In this way, the communication device obtains precoding information on the at least two uplink carriers by receiving a single piece of indication information, so that uplink transmission is simultaneously performed on the at least two uplink carriers. This reduces signaling detection overheads and power consumption of the communication device.

With reference to the third aspect, in an implementation, the uplink transmission includes first uplink transmission and/or second uplink transmission. The sending unit is further configured to send the first uplink transmission on the at least two uplink carriers based on the first indication information; or the sending unit is further configured to send the first uplink transmission on the first uplink carrier of the at least two uplink carriers based on the first indication information, and send the second uplink transmission on the second uplink carrier of the at least two uplink carriers.

With reference to the third aspect, in an implementation, the first indication information further includes a first power parameter and a second power parameter. The first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

In this way, the communication device performs uplink transmission on the at least two uplink carriers by using different power control parameters. This avoids a problem that determining of a transmission power of the uplink transmission is affected because different MPRs are caused by different frequency domain resource allocations on the two uplink carriers.

With reference to the third aspect, in an implementation, the at least two uplink carriers are in at least one of the following cases: at least one supplementary uplink SUL carrier and at least one non-SUL carrier; at least two uplink carriers used for uplink carrier aggregation; at least two uplink carriers used for dual connectivity; SUL carriers; and consecutive uplink carriers.

According to a fourth aspect, at least one embodiment provides a communication apparatus. The communication apparatus is the network device in the second aspect, or an electronic device disposed in the network device, or a large device including the network device. The communication apparatus includes: a processing unit, configured to determine at least two uplink carriers; and a sending unit, configured to send first indication information to a terminal device, where the first indication information indicates the terminal device to send uplink transmission on the at least two uplink carriers.

In this way, the communication device provided in at least one embodiment sends the first indication information, to indicate the terminal device to send the uplink transmission on the at least two uplink carriers, to effectively reduce control signaling overheads.

With reference to the fourth aspect, in an implementation, the first indication information further indicates the terminal device to determine, based on M first resources or N first resource sets on the at least two uplink carriers, first precoding used for data sending, where M is a positive integer greater than or equal to 2, and N is a positive integer greater than or equal to 1.

With reference to the fourth aspect, in an implementation, the at least two uplink carriers include a first uplink carrier and a second uplink carrier. The M first resources or the N first resource sets include P first resources on the first uplink carrier and Q first resources on the second uplink carrier, where both P and Q are integers greater than or equal to 1.

In this way, the communication device configures the M first resources or the N first resource sets for the terminal device. The M resources are any combination of first resources on the at least two uplink carriers, and the N first resource sets are sets of any combination of the first resources on the at least two uplink carriers. This ensures that the terminal device freely selects a first resource combination, and a transmit capability of the terminal device is fully utilized.

With reference to the fourth aspect, in an implementation, the at least two uplink carriers include a first uplink carrier and a second uplink carrier. The first indication information further indicates first precoding used for data sending, and the first precoding includes precoding that is used for data sending and that is on the first uplink carrier and precoding that is used for data sending and that is on the second uplink carrier.

In this way, the communication device jointly schedules precoding information on the at least two uplink carriers by receiving a single piece of indication information, so that simultaneous scheduling of the uplink transmission is performed on the at least two uplink carriers. This improves transmission performance.

With reference to the fourth aspect, in an implementation, the first indication information further indicates a number of transmission layers corresponding to uplink transmission. A number of transmission layers corresponding to the first precoding is a sum of a number of transmission layers for uplink transmission on the first uplink carrier and a number of transmission layers for uplink transmission on the second uplink carrier.

With reference to the fourth aspect, in an implementation, the first indication information further includes a first power parameter and a second power parameter. The first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

With reference to the fourth aspect, in an implementation, the at least two uplink carriers are in at least one of the following cases: at least one supplementary uplink SUL carrier and at least one non-SUL carrier; at least two uplink carriers used for uplink carrier aggregation; at least two uplink carriers used for dual connectivity; supplementary uplink SUL carriers; and consecutive uplink carriers.

According to a fifth aspect, at least one embodiment provides a communication apparatus, including a processor, a storage medium, at least one processor, and an interface circuit. The interface circuit is configured to receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the first aspect or the possible implementations of the first aspect. The communication apparatus is a terminal device, or is a chip in the terminal device.

According to a sixth aspect, at least one embodiment provides a communication apparatus, including a processor, a storage medium, at least one processor, and an interface circuit. The interface circuit is configured to receive a signal from another communication apparatus other than the communication apparatus and transmit the signal to the processor, or send the signal from the processor to the another communication apparatus other than the communication apparatus. The processor is configured to implement, by using a logic circuit or executing code instructions, the method according to any one of the second aspect or the possible implementations of the second aspect. The communication apparatus is a network device, or is a chip in the network device.

According to a seventh aspect, at least one embodiment provides a communication system, including a first communication apparatus and a second communication apparatus. The first communication apparatus is configured to perform the method according to any one of the first aspect or the possible implementations of the first aspect. The second communication apparatus is configured to perform the method according to any one of the second aspect or the possible implementations of the second aspect.

According to an eighth aspect, at least one embodiment provides a computer-readable storage medium. The computer-readable storage medium stores instructions, and in response to the instructions being run on a computer, the computer is enabled to perform the method according to any one of the first aspect or the possible implementations of the first aspect.

According to a ninth aspect, at least one embodiment provides a computer-readable storage medium. The computer-readable storage medium stores instructions, and in response to the instructions being run on a computer, the computer is enabled to perform the method according to any one of the second aspect or the possible implementations of the second aspect.

According to a tenth aspect, at least one embodiment provides a computer program product including instructions. In response to the computer program product running on a computer, the computer is enabled to perform the method according to any one of the first aspect or the possible implementations of the first aspect.

According to an eleventh aspect, at least one embodiment provides a computer program product including instructions. In response to the computer program product running on a computer, the computer is enabled to perform the method in the second aspect or any possible implementation of the second aspect.

Descriptions of technical features, technical solutions, beneficial effect, or similar words in at least one embodiment do not imply that all features and advantages is implemented in any individual embodiment. On the contrary, the descriptions of the features or the beneficial effect mean that at least one embodiment includes a specific technical feature, technical solution, or beneficial effect. Therefore, the descriptions of the technical features, the technical solutions, or the beneficial effect described in embodiment herein are not necessarily specific to a same embodiment. Further, the technical features, the technical solutions, and the beneficial effect described in embodiments is combined in any proper manner. A person skilled in the art understands that an embodiment is implemented without one or more specific technical features or technical solutions, or beneficial effects in a specific embodiment. In other embodiments, additional technical features and beneficial effect is identified in a specific embodiment that does not reflect all embodiments.

DESCRIPTION OF EMBODIMENTS

In descriptions of embodiments described herein, unless otherwise specified, "/" means "or". For example, A/B represents A or B. A term "and/or" in this specification describes only an association relationship between associated objects and indicates that there is three relationships. For example, A and/or B represents the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

A term such as "example" or "for example" is used for representing an example, an example illustration, or a description below. Any embodiment or design scheme described as an "example" or "for example" in at least one embodiment should not be construed as being more preferred or having more advantages than another embodiment or design scheme. Exactly, using of the word "example" or "for example" or the like is intended to present a relative concept in a specific manner.

Figure 1:
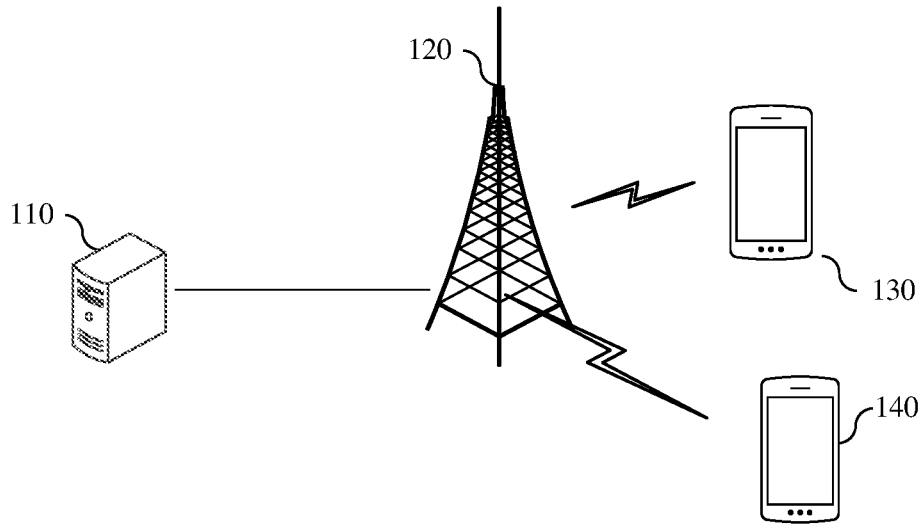
FIG. 1 is a schematic diagram of an architecture of a communication system according to at least one embodiment.

An uplink transmission method provided in at least one embodiment is applied to a communication system 100 shown in FIG. 1.

FIG. 1 is a schematic diagram of an architecture of a communication system to which an embodiment is applied. As shown in FIG. 1, the communication system 100 includes a core network device 110, a network device 120, and at least one terminal device (for example, a terminal device 130 and a terminal device 140 shown in FIG. 1). The terminal device is connected to the network device in a wireless manner, and the network device is connected to the core network device in a wireless manner or a wired manner. The core network device and the network device is different physical devices independent of each other; functions of the core network device and logical functions of the network device is integrated into a same physical device; or some functions of the core network device and some functions of the network device is integrated into one physical device. The terminal device is located at a fixed position, or is mobile. FIG. 1 is only a schematic diagram. The communication system further includes another network device, for example, further includes a wireless relay device and a wireless backhaul device, which are not shown in FIG. 1.

Figure 2:
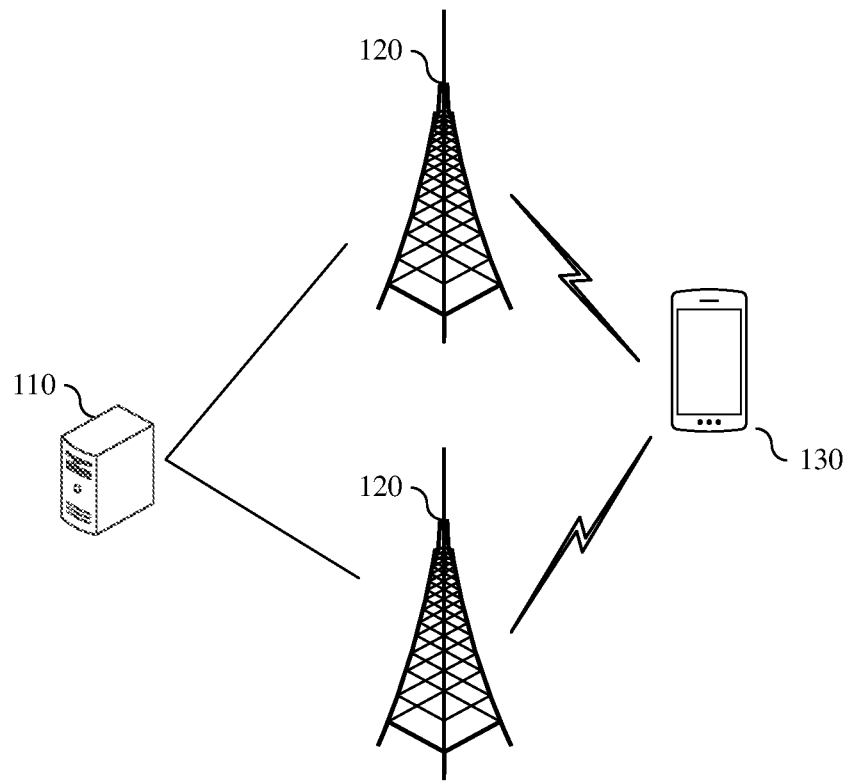
FIG. 2 is a schematic diagram of an architecture of another communication system according to at least one embodiment.

Quantities of core network devices, network devices, and terminal devices included in the communication system are not limited in at least one embodiment. FIG. 2 is a schematic diagram of an architecture of another communication system to which at least one embodiment is applied. As shown in FIG. 2, a communication system 100 also includes a core network device, at least two network devices, and at least one terminal device.

The network device 120 is for configuring an uplink transmission resource for the terminal device, and communicate with the terminal device 130. The terminal device 130 is configured to perform uplink data transmission or uplink control transmission based on the uplink transmission resource configured by the network device.

The communication system in at least one embodiment includes but is not limited to a long term evolution (long term evolution, LTE) system, a 5th-generation (5th-generation, 5G) system, a new radio (new radio, NR) system, a wireless local area network (wireless local area network, WLAN) system, a future evolved system, or a plurality of converged communication systems. For example, a method provided in at least one embodiment is specifically applied to an evolved universal terrestrial radio access network (evolved universal terrestrial radio access network, E-UTRAN) and a next generation radio access network (next generation radio access network, NG-RAN) system.

The network device in at least one embodiment is an entity that is on a network side and that is configured to send a signal, receive a signal, or send a signal and receive a signal. The network device is an apparatus that is deployed in a radio access network (radio access network, RAN) and that provides a wireless communication function for a terminal device, for example, is a TRP, a base station (for example, an evolved NodeB (evolved NodeB, eNB or eNodeB), a next generation node base station (next generation node base station, gNB), or a next generation eNB (next generation eNB, ng-eNB)), various forms of control nodes (for example, a network controller, a radio controller (such as a radio controller in a cloud radio access network (cloud radio access network, CRAN) scenario)), or a road side unit (road side unit, RSU). Specifically, the network device is a macro base station, a micro base station (also referred to as a small cell), a relay station, an access point (access point, AP), or the like in various forms, or is an antenna panel of a base station. The control node is connected to a plurality of base stations, and configure resources for a plurality of terminal devices that fall within coverage of the plurality of base stations. In systems using different radio access technologies (radio access technologies, RATs), names of devices having a base station function is different. For example, the base station is referred to as an eNB or an eNodeB in an LTE system, and is referred to as a gNB in a 5G system or an NR system. A specific name of the base station is not limited in at least one embodiment. The network device is alternatively a network device in a future evolved public land mobile network (public land mobile network, PLMN) or the like.

The terminal device in at least one embodiment is an entity that is on a user side and that is configured to receive a signal, send a signal, or receive a signal and send a signal. The terminal device is configured to provide one or more of a voice service and a data connectivity service for a user. The terminal device is also referred to as user equipment (user equipment, UE), a terminal, an access terminal, a subscriber unit, a subscriber station, a mobile station, a remote station, a remote terminal, a mobile device, a user terminal, a wireless communication device, a user agent, or a user apparatus. The terminal device is a vehicle-to-everything (vehicle-to-everything, V2X) device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in HEV, PHEV), or a new energy vehicle (new energy vehicle). Alternatively, the terminal device is a device-to-device (device-to-device, D2D) device, for example, an electricity meter or a water meter. Alternatively, the terminal device is a mobile station (mobile station, MS), a subscriber unit (subscriber unit), an uncrewed aerial vehicle, an internet of things (internet of things, IoT) device, a station (station, ST) in a WLAN, a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which is also referred to as a wearable intelligent device). The terminal device is alternatively a terminal device in a next-generation communication system, for example, a terminal device in a 5G system, a terminal device in a future evolved PLMN, or a terminal device in an NR system.

The network device and the terminal device is deployed on the land, including an indoor device, an outdoor device, a handheld device, or a vehicle-mounted device; is deployed on the water surface; or is deployed on a plane, a balloon, and a satellite in the air. An application scenario of the network device and the terminal device is not limited in embodiments described herein.

Communication between the network device and the terminal device and communication between terminal devices is performed by using a licensed spectrum (licensed spectrum), an unlicensed spectrum (unlicensed spectrum), or both the licensed spectrum and the unlicensed spectrum. The communication between the network device and the terminal device and the communication between the terminal devices is performed by using a spectrum below 6 GHz, or a spectrum above 6 GHz, or both a spectrum below 6 GHz and a spectrum above 6 GHz. A spectrum resource used between the network device and the terminal device is not limited in embodiments described herein.

Figure 3:
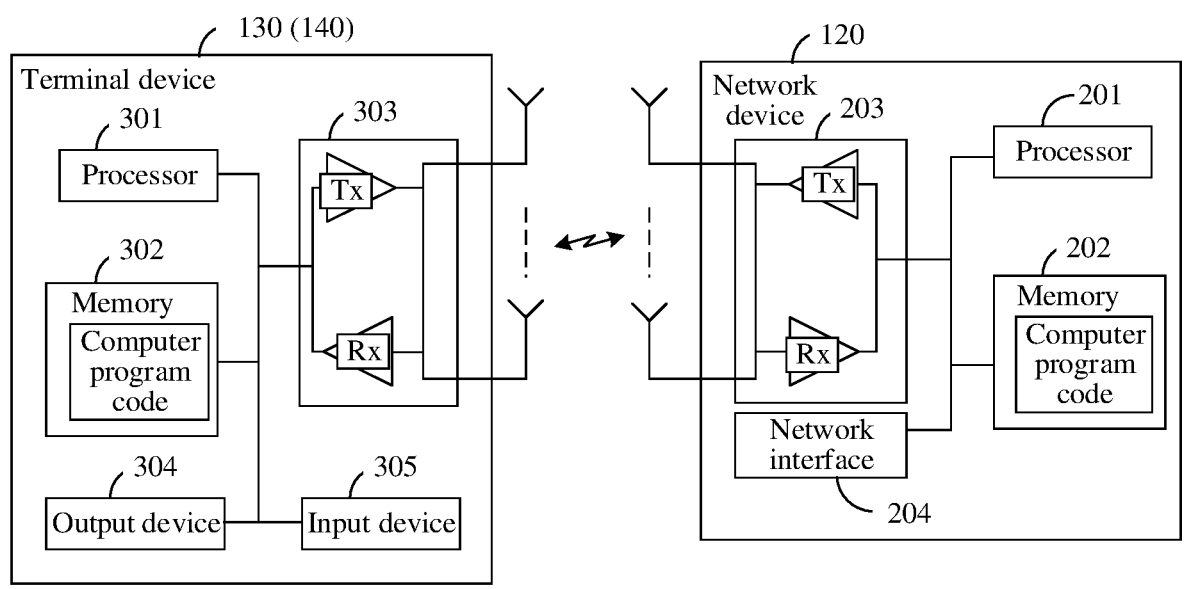
FIG. 3 is a schematic diagram of hardware structures of a network device and a terminal device according to at least one embodiment.

FIG. 3 is a schematic diagram of hardware structures of a network device and a terminal according to at least one embodiment.

A terminal device 130 includes at least one processor 301, at least one memory 302, and at least one transceiver 303. Optionally, the terminal device 130 further includes an output device 304 and an input device 305.

The processor 301, the memory 302, and the transceiver 303 are connected through a bus. The processor 301 is a general-purpose central processing unit (Central Processing Unit, CPU), a microprocessor, an application-specific integrated circuit (Application-Specific Integrated Circuit, ASIC), or one or more integrated circuits configured to control program execution in the solutions of at least one embodiment. The processor 301 alternatively includes a plurality of CPUs, and the processor 301 is a single-core (single-CPU) processor or a multi-core (multi-CPU) processor. The processor herein is one or more devices, circuits, or processing cores configured to process data (for example, computer program instructions).

The memory 302 is a read-only memory (Read-Only Memory, ROM) or another type of static storage device that stores static information and instructions, or a random access memory (Random Access Memory, RAM) or another type of dynamic storage device that stores information and instructions or is an electrically erasable programmable read-only memory (Electrically Erasable Programmable Read-Only Memory, EEPROM), a compact disc read-only memory (Compact Disc Read-Only Memory, CD-ROM), or another compact disc storage, an optical disc storage (including a compact disc, a laser disc, an optical disc, a digital versatile disc, and a Blu-ray disc, or the like), a disk storage medium or another disk storage device, or any other medium that is used to carry or store expected program code in an instruction or data structure form and that is accessed by a computer. The memory 302 exists independently, and is connected to the processor 301 through the bus. The memory 302 is alternatively integrated with the processor 301. The memory 302 is configured to store application program code for executing the solutions of at least one embodiment, and the processor 301 controls the execution. The processor 301 is configured to execute computer program code stored in the memory 302, to implement the coordinated transmission method in at least one embodiment.

The transceiver 303 uses any type of apparatus such as a transceiver, and is configured to communicate with another device or a communication network such as an Ethernet, a radio access network (Radio Access Network, RAN), or a wireless local area network (Wireless Local Area Networks, WLAN). The transceiver 303 includes a transmitter Tx and a receiver Rx.

The output device 304 communicates with the processor 301, and displays information in a plurality of manners. For example, the output device 304 is a liquid crystal display (Liquid Crystal Display, LCD), a light emitting diode (Light Emitting Diode, LED) display device, a cathode ray tube (Cathode Ray Tube, CRT) display device, a projector (projector), or the like. The input device 305 communicates with the processor 301, and receives input of a user in a plurality of manners. For example, the input device 305 is a mouse, a keyboard, a touchscreen device, or a sensing device.

The network device 120 includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device over a link (such as an Si interface), or connect to a network interface of another network device over a wired or wireless link (such as an X2 interface) (not shown in the figure). This is not specifically limited in at least one embodiment. In addition, for related descriptions of the processor 201, the memory 202, and the transceiver 203, refer to the descriptions of the processor 301, the memory 302, and the transceiver 303 in the terminal device 130. Details are not described herein again.

To better understand the method described in at least one embodiment, uplink transmission in two forms in at least one embodiment is first described.

1. Non-Codebook-Based Uplink Transmission

An NR system allows a network device (for example, a base station) to configure, for a sounding reference signal (sounding reference signal, SRS) resource set used in a non-codebook-based uplink transmission scheme, an associated non-zero power (non-zero power, NZP) channel state information reference signal (channel state information reference signal, CSI-RS) resource used for channel measurement. A terminal device (for example, UE) obtains, based on the associated NZP CSI-RS resource, precoding of SRS signal transmission of an SRS resource set used in the non-codebook-based uplink transmission scheme.

The base station configures, for the UE, a plurality of downlink reference signals used to demodulate a downlink channel. The downlink reference signals include a CSI-RS or a demodulation reference signal (demodulation reference signal, DMRS). The CSI-RS is used for beam management and downlink CSI measurement. The UE obtains a candidate uplink precoding matrix based on the downlink reference signal.

The base station configures, for the UE, one SRS resource set used for uplink transmission. The SRS resource set includes one to four SRS resources, and each SRS resource includes one SRS port. The base station indicates, via a sounding reference signal indication (Sounding Reference Signal Indication, SRI), one or more SRS resources for determining precoding of a physical uplink shared channel (physical uplink shared channel, PUSCH). A number of SRS resources indicated by the SRI is a number of transmission layers of the PUSCH on an uplink carrier.

During non-codebook-based uplink transmission, a size of an SRI field is $$\left\lceil \log_2\left(\sum_{k=1}^{\min\{L_{max}, N_{SRS}\}} \binom{N_{SRS}}{k}\right) \right\rceil$$

bits, where $N_{SRS}$ is a number of SRS resources in an SRS resource set configured by the base station for the UE. $L_{max}$ is a maximum number of transmission layers of the PUSCH on the uplink carrier. $L_{max}$ is configured by a higher layer parameter maxMIMO-Layers.

In response to the maximum number of transmission layers being 2, SRIs for non-codebook-based PUSCH transmission are shown in Table 1.

The base station indicates, via an SRI, a transmission precoding matrix indicator (transmission precoding matrix indicator, TPMI), and a number of layers (number of layers) indication in downlink control information (Downlink Control Information, DCI), the UE to determine precoding for

TABLE 1

| Bit field mapped to index (Bit field mapped to index) | SRI(s), $N_{SRS}$ = 2 | Bit field mapped to index (Bit field mapped to index) | SRI(s), $N_{SRS}$ = 3 | Bit field mapped to index (Bit field mapped to index) | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | Reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | Reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | Reserved |

For example, in response to there being three SRS resources in the SRS resource set configured by the base station for the UE, a value of the SRI field is 4, and indexes of corresponding SRS resources are 0 and 2. In this case, SRS ports corresponding to the two SRS resources whose indexes are 0 and 2 are antenna ports for PUSCH transmission. In other words, PUSCH transmission corresponds to two SRS ports. In addition, because the SRI indicates two SRS resources, a number of transmission layers for PUSCH transmission on the uplink carrier is 2. The UE determines a precoding matrix of data based on the SRS resource for uplink transmission indicated by the SRI, to encode the data.

Figure 4:
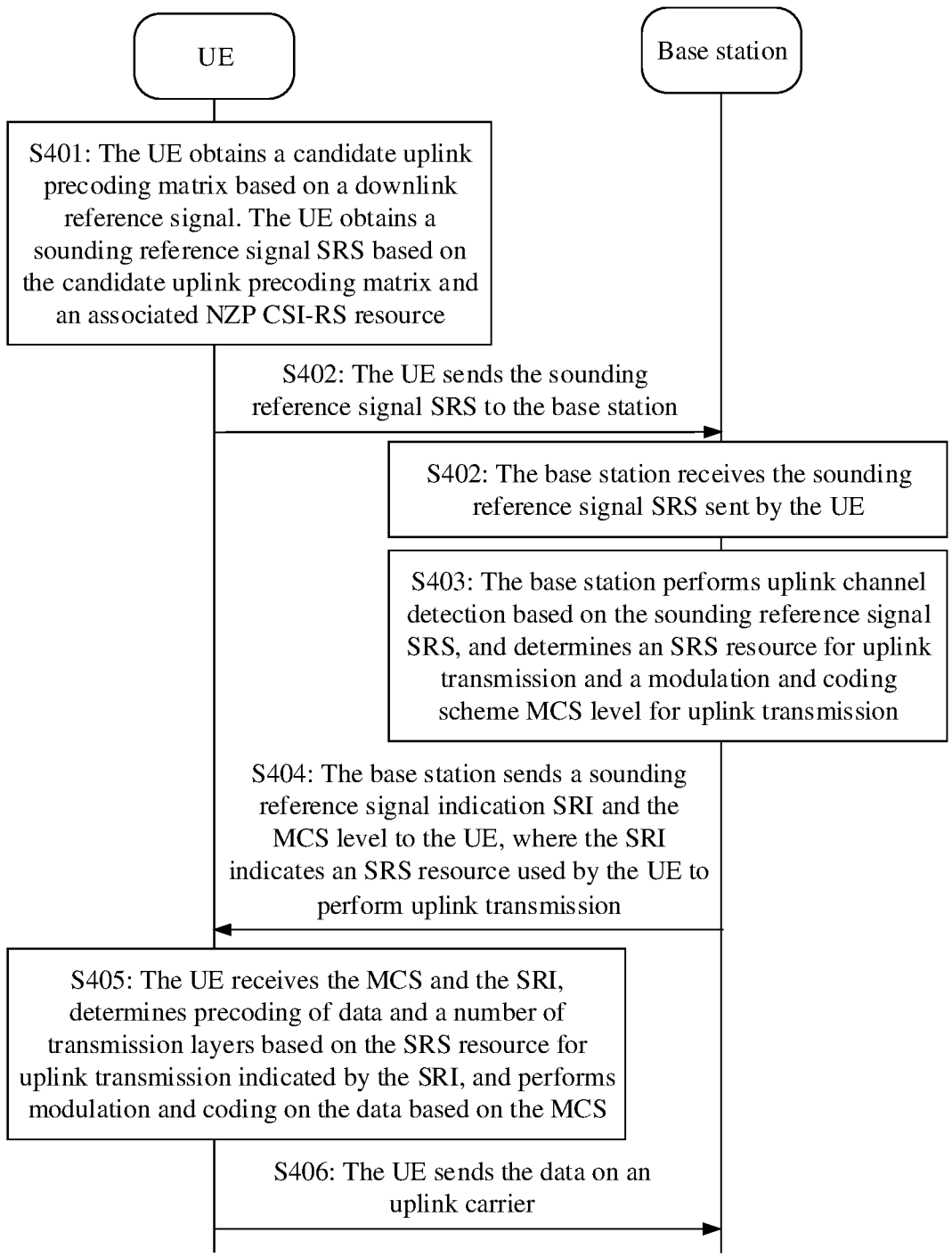
FIG. 4 is a schematic flowchart of non-codebook-based uplink transmission.

FIG. 4 is a schematic flowchart of non-codebook-based uplink transmission. As shown in FIG. 4, a specific implementation procedure of the non-codebook-based uplink transmission is as follows:

S401: UE obtains a candidate uplink precoding matrix based on a downlink reference signal. The UE obtains a sounding reference signal SRS based on the candidate uplink precoding matrix and an associated NZP CSI-RS resource.

S402: The UE sends the sounding reference signal SRS to a base station, and correspondingly, the base station receives the sounding reference signal SRS sent by the UE.

S403: The base station performs uplink channel detection based on the sounding reference signal SRS, and determines an SRS resource for uplink transmission and a modulation and coding scheme (Modulation and Coding Scheme, MCS) level for uplink transmission.

S404: The base station sends a sounding reference signal indication SRI and the MCS level to the UE, where the SRI indicates an SRS resource used by the UE to perform uplink transmission.

S405: The UE receives the MCS and the SRI, determines precoding of data and a number of transmission layers based on the SRS resource that is for uplink transmission and that is indicated by the SRI, and performs modulation and coding on the data based on the MCS.

S406: The UE sends the data on an uplink carrier.

The data is a part of uplink transmission.

2. Codebook-Based Uplink Transmission

In an NR system, a base station configures a plurality of SRS (sounding reference resource, sounding reference signal) resources for UE, and one SRS resource is configured with 1, 2, or 4 SRS ports.

PUSCH transmission, to assist the UE in determining, based on an SRS resource selected by the base station, an antenna, analog beamforming, and the like used for PUSCH transmission. Certainly, the SRI, the TPMI, and the number of layers indication is alternatively configured by using higher layer parameters srs-ResourceIndicator and precodingAndNumberOfLayers.

The SRI in the downlink control information DCI indicates, to the UE, an SRS resource used for PUSCH transmission on an uplink carrier, and a number of SRS ports corresponding to the SRS resource selected by the SRI is the same as a number of ports corresponding to PUSCH transmission. The number of SRS ports corresponding to the SRS resource is indicated by a field nrofSRS-Ports in a higher layer parameter SRS-Config used to configure an SRS.

During codebook-based uplink transmission, a size of an SRI field is $\lceil \log_2 N_{SRS} \rceil$ bits. $N_{SRS}$ represents a number of SRS resources configured by the base station for an uplink transmission mode corresponding to a PUSCH. In response to the base station configuring only one SRS resource for one uplink transmission mode of the UE, a PUSCH in the uplink transmission scheme corresponds to the SRS resource, and there is no SRI field in uplink scheduling information.

The TPMI in the downlink control information DCI indicates precoding applied to layers {0 . . . v−1}. For example, in response to only one SRS resource being configured, the TPMI indicates precoding applied to a v layer, and the v layer corresponds to one SRS resource indicated by the SRI. In addition, the TPMI further indicates a number of transmission layers for PUSCH transmission on the uplink carrier. Table 2 is a code bit representation of "precoding information and number of transmission layers", as shown in Table 2.

TABLE 2

| Precoding and number of transmission layers | |
|---|---|
| Bit field mapped to index | Codebook subset = non-coherent |
| 0 | 1 layer: TPMI = 0 |
| 1 | 1 layer: TPMI = 1 |
| 2 | 2 layers: TPMI = 0 |
| 3 | 1 layer: TPMI = 2 |

Table 3 is a precoding matrix W-1 of single-layer transmission of two antenna ports, as shown in Table 3.

TABLE 3

Precoding matrix W-1

| TPMI index | W (TPMI index increases from left to right) | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

Table 4 is a precoding matrix W-2 of single-layer transmission of four antenna ports, as shown in Table 4.

TABLE 4

Precoding matrix W-2

| TPMI index | W (TPMI index increases from left to right) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\1\\1\end{bmatrix}$ | $\frac{1}{2}\begin{bmatrix}1\\1\\j\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

Table 5 is a precoding matrix W-3 of two-layer transmission of two antenna ports, as shown in Table 5.

TABLE 5

Precoding matrix W-3

| TPMI index | W (TPMI index increases from left to right) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Figure 5:
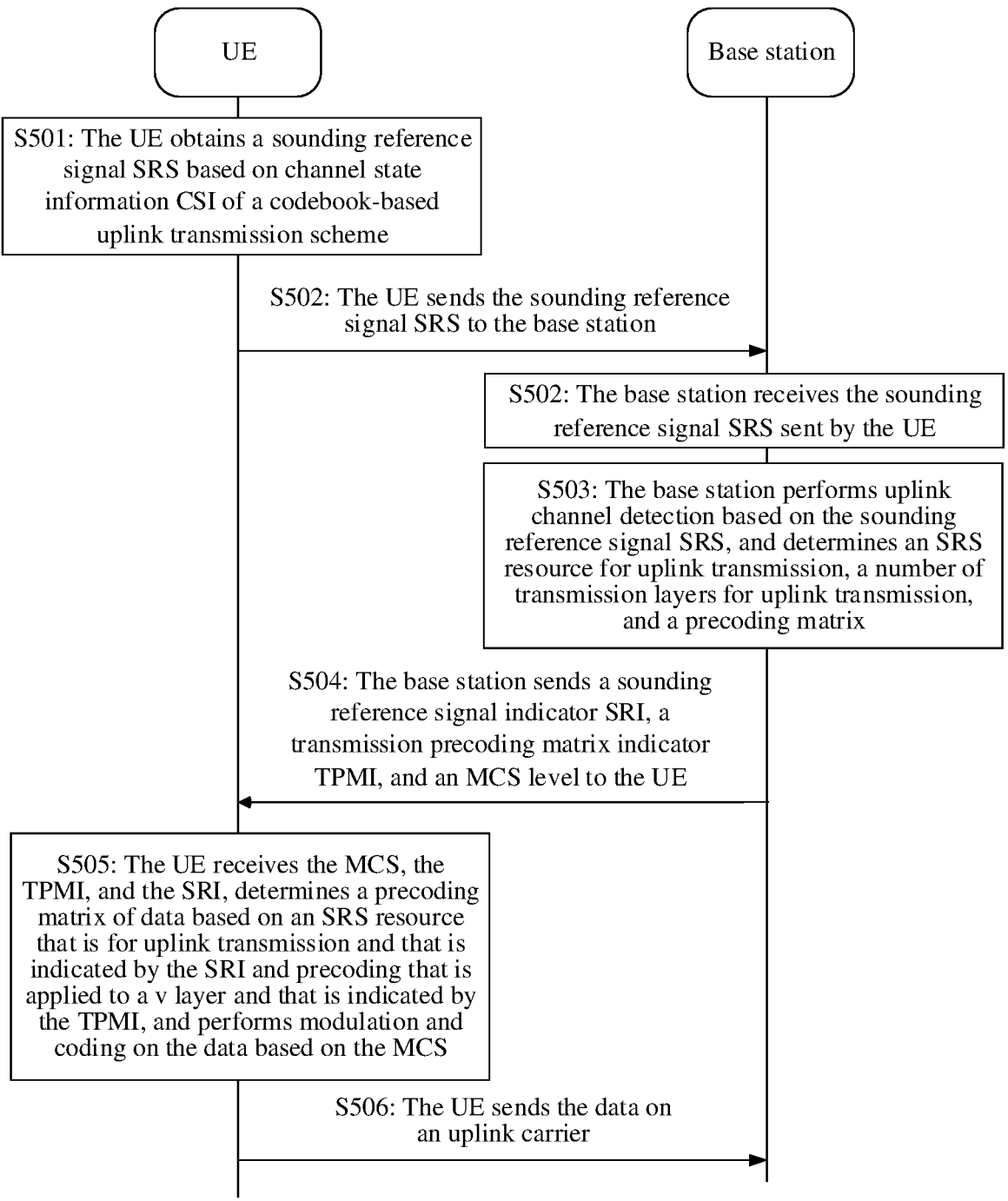
FIG. 5 is a schematic flowchart of codebook-based uplink transmission.

FIG. 5 is a schematic flowchart of codebook-based uplink transmission. As shown in FIG. 5, a specific implementation procedure of the codebook-based uplink transmission is as follows:

S501: UE obtains a sounding reference signal SRS based on channel state information CSI of a codebook-based uplink transmission scheme.

S502: The UE sends the sounding reference signal SRS to a base station, and correspondingly, the base station receives the sounding reference signal SRS sent by the UE.

S503: The base station performs uplink channel detection based on the sounding reference signal SRS, and determines an SRS resource for uplink transmission, a number of transmission layers for uplink transmission, and a precoding matrix.

S504: The base station sends a sounding reference signal indication SRI, a transmission precoding matrix indicator TPMI, and an MCS level to the UE.

S505: The UE receives the MCS, the TPMI, and the SRI, determines a precoding matrix of data based on the SRS resource that is for uplink transmission and that is indicated by the SRI and precoding that is applied to a v layer and that is indicated by the TPMI, and performs modulation and coding on the data based on the MCS.

S506: The UE sends the data on an uplink carrier.

To enhance uplink coverage, a supplementary uplink carrier (Supplementary Uplink, SUL) carrier is introduced in 5G NR. A main operating frequency band of 5G NR is C-band 3.5 GHz. Compared with typical LTE frequency bands 1.8 GHz and 700 MHz, 5G NR has a higher operating frequency, greater penetration loss and distance loss of uplink signal transmission, and about 14 dB smaller uplink coverage than downlink coverage. This decreases a success rate of cell edge users accessing a cell.

Figure 6:
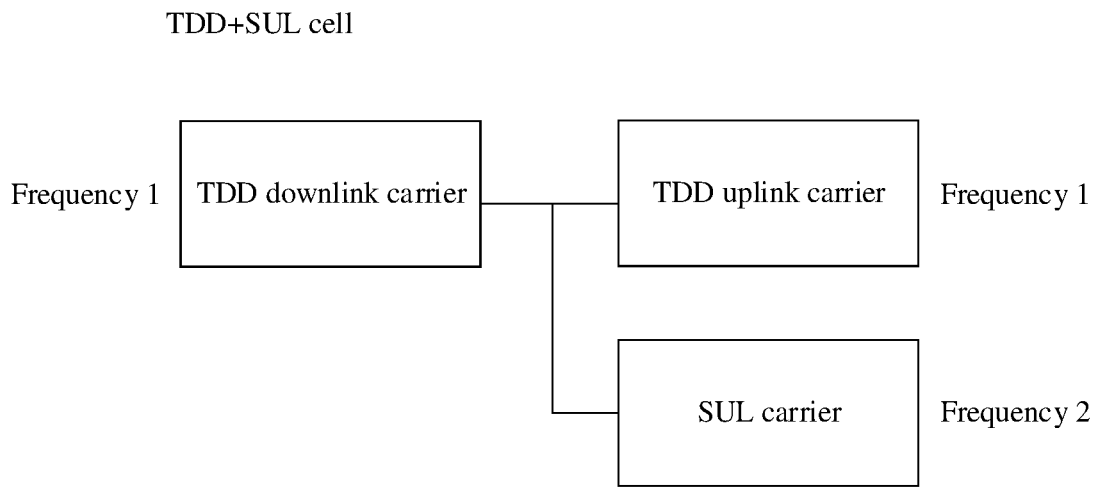
FIG. 6 is a schematic diagram of a structure of a cell in which a TDD carrier and an SUL carrier are combined.

FIG. 6 is a schematic diagram of a structure of a cell in which a TDD (Time Division Duplex) carrier and a supplementary uplink (supplementary uplink, SUL) carrier are combined. As shown in FIG. 6, in a current technology, a new cell type is defined for a combination of an SUL carrier and a TDD carrier by using 5G NR. The cell includes one downlink carrier and two uplink carriers. A carrier aggregation technology is used to aggregate different component carriers in a same frequency band or different frequency bands to obtain a higher bandwidth, to increase user peak rate by multiple times. However, each uplink carrier supports independent media access control (Media access control, MAC) and hybrid automatic repeat request (Hybrid Automatic Repeat reQuest, HARQ) entities. Therefore, uplink transmission of the two carriers is separately scheduled by using different downlink control information DCI, resulting in large control signaling overheads.

To enable the UE to simultaneously send uplink transmission on two uplink carriers to achieve an objective of using a plurality of uplink spectrum resources to increase an uplink capacity in response to control signaling overheads being reduced, at least one embodiment provides an uplink transmission method. In the method, a terminal device receives first indication information, and the first indication information indicates at least two uplink carriers, to effectively reduce control signaling overheads. In addition, the terminal device sends uplink transmission on the at least two uplink carriers based on the first indication information, so that the terminal device sends the uplink transmission on a plurality of uplink carriers. Therefore, in at least one embodiment, the uplink transmission is sent on the plurality of uplink carriers in response to control signaling overheads being reduced, so that an objective of using a plurality of uplink spectrum resources to increase an uplink capacity is achieved.

All methods in the following embodiments is implemented in devices (for example, the terminal device 130 and the terminal device 140 in FIG. 1) having the foregoing hardware structure.

Figure 7:
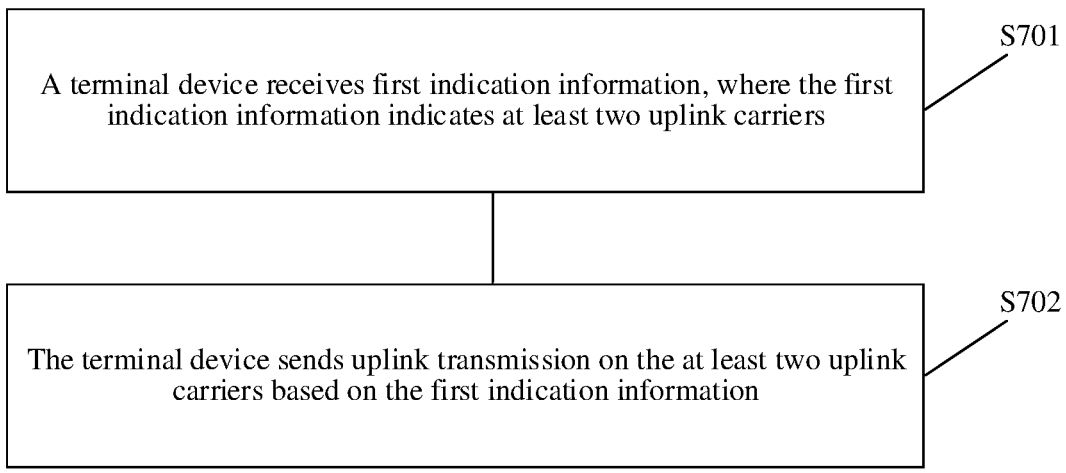
FIG. 7 is a schematic flowchart of an uplink transmission method according to at least one embodiment.

FIG. 7 is a schematic flowchart of an uplink transmission method according to at least one embodiment. As shown in FIG. 7, the uplink transmission method includes the following steps:

S701: A terminal device receives first indication information, where the first indication information indicates at least two uplink carriers.

That the first indication information indicates at least two uplink carriers is understood as that the first indication information indicates frequency domain resources on the at least two uplink carriers.

The at least two uplink carriers are in at least one of the following cases:

1. At least one supplementary uplink SUL carrier and at least one non-SUL carrier.

The non-SUL carrier is referred to as an NUL (normal uplink) carrier.

Optionally, one SUL carrier and one non-SUL carrier belong to a same serving cell, or one SUL carrier and one non-SUL carrier are configured by using a same system information block 1 SIB1.

Optionally, one SUL carrier and one non-SUL carrier correspond to a same network device, that is, are deployed in a co-located site (co-located site). Alternatively, one SUL carrier and one non-SUL carrier correspond to two different network devices, that is, are deployed in different-located sites (different-located sites).

Optionally, a plurality of SUL carriers and one non-SUL carrier belong to a same serving cell, or a plurality of SUL carriers and one non-SUL carrier are configured by using a same system information block 1 SIB1. For example, the network device configures one non-SUL carrier and two SUL carriers for the terminal device, and the terminal device supports four radio frequency chains, that is, four transmit antennas. Two radio frequency chains are configured on the non-SUL carrier, and one radio frequency chain is configured on each of the two SUL carriers. In other words, uplink transmission on the non-SUL carrier is sent by using two antennas, and uplink transmission on the two SUL carriers is sent by using one antenna.

2. At least two uplink carriers used for uplink carrier aggregation.

The at least two uplink carriers used for uplink carrier aggregation is one primary cell (primary cell, PCell) carrier and at least one secondary cell (Secondary Cell, SCell) carrier. The PCell carrier and the SCell carrier is TDD time division duplex (Time Division Duplex) carriers, or FDD UL frequency division duplex uplink (Frequency Division Duplex Uplink) carriers.

3. At least two uplink carriers used for dual connectivity.

The at least two uplink carriers used for dual connectivity is a master cell group MCG (Master cell group) and a secondary cell group SCG (Secondary cell group). One MCG includes at least one uplink carrier, and one SCG also includes at least one uplink carrier.

4. SUL carriers.

The at least two uplink carriers are all SUL carriers, and a number of SUL carriers is not less than 2. Optionally, a plurality of SUL carriers belong to a same serving cell, or a plurality of SUL carriers are configured by using a same system information block 1 SIB1.

5. Consecutive uplink carriers.

The at least two uplink carriers are consecutive uplink carriers.

For example, the at least two uplink carriers include a first uplink carrier, a second uplink carrier, a third uplink carrier, a fourth uplink carrier, and a fifth uplink carrier.

Frequency bands of the first uplink carrier to the fifth uplink carrier are CC #1 to CC #5 in sequence. CC #1 and CC #2 are adjacent frequency carriers, CC #2 and CC #3 are adjacent frequency carriers, CC #3 and CC #4 are adjacent frequency carriers, and CC #4 and CC #5 are adjacent frequency carriers. Specific types of the at least two uplink carriers is any one of the foregoing examples, or is any combination of the foregoing examples. In addition, the specific types of the at least two uplink carriers are merely examples. The at least two uplink carriers in at least one embodiment is alternatively of another type or a combination. This is not limited in at least one embodiment.

For uplink non-codebook-based uplink transmission and codebook-based uplink transmission, correspondingly, indication content of the first indication information is different. Details are as follows:

1. Non-Codebook-Based Uplink Transmission.

It is assumed that the at least two uplink carriers includes the first uplink carrier and the second uplink carrier.

The network device configures the first uplink carrier and the second uplink carrier for the terminal device for simultaneous uplink transmission.

Simultaneous transmission (Simultaneous transmission), also referred to as concurrent transmission (Concurrent Transmission), means that the terminal device simultaneously sends uplink transmission on the first uplink carrier and the second uplink carrier. Optionally, time domain resources occupied by the uplink transmission on the first uplink carrier and the second uplink carrier are at least partially or completely overlapped. Optionally, the terminal device receives a single piece of downlink control information DCI, and sends the uplink transmission on the at least two uplink carriers.

Specifically, a maximum number of p first resources is configured on the first uplink carrier, and a maximum number of q first resources is configured on the second uplink carrier. Both p and q are positive integers greater than or equal to 1.

Specifically, the first resource is an SRS resource. The first indication information is an SRI, and therefore an SRI field includes $$\left\lceil \log_2\left(\Sigma_{k=1}^2\binom{p+q}{k} - \Sigma_{k=1}^2\binom{p}{k} - \Sigma_{k=1}^2\binom{q}{k}\right)\right\rceil \text{ bits.}$$

Alternatively, the SRI field includes $$\left\lceil \log_2\left(\Sigma_{k=1}^2\binom{p+q}{k}\right)\right\rceil \text{ bits.}$$

In the non-codebook-based uplink transmission, the first indication information further indicates M first resources or N first resource sets on the at least two uplink carriers, M is a positive integer greater than or equal to 2, and N is a positive integer greater than or equal to 1.

The M first resources is M SRS resources, and the N first resource sets is sets of any combination of SRS resources on the at least two uplink carriers.

The M first resources are used as an example. The terminal device determines, by using the M first resources, first precoding that is on the at least two uplink carriers and that is used for data sending. In other words, the M first resources are shared resources based on which the terminal device determines the first precoding on the at least two uplink carriers.

In this case, the SRI field includes $$\left\lceil \log_2\left(\Sigma_{k=1}^M\binom{p+q}{k} - \Sigma_{k=1}^M\binom{p}{k} - \Sigma_{k=1}^M\binom{q}{k}\right)\right\rceil \text{ bits.}$$

Alternatively, the SRI field includes $$\left\lceil \log_2\left(\Sigma_{k=1}^M\binom{p+q}{k}\right)\right\rceil \text{ bits.}$$

Further, the M first resources includes P first resources on the first uplink carrier and Q first resources on the second uplink carrier. Both P and Q are positive integers greater than or equal to 1. Alternatively, the N first resource sets includes P first resources on the first uplink carrier and Q first resources on the second uplink carrier. The P first resources are indicated by the first indication information from the p first resources, and the Q first resources are indicated by the first indication information from the q first resources.

The terminal device determines, based on the M first resources or the N first resource sets, the first precoding used for data sending.

It should be understood that the network device indicates the M first resources that are shared by the terminal device and that are on the at least two uplink carriers. The M first resources include the P first resources on the first uplink carrier and the Q first resources on the second uplink carrier. The terminal device determines, based on the P first resources on the first uplink carrier and the Q first resources on the second uplink carrier, the first precoding used for data sending. The data is a part of uplink transmission.

A maximum number of transmission layers for uplink transmission on the first uplink carrier and the second uplink carrier is a number of SRS resources indicated by the first indication information.

Example 1: An assumption is that p=4, q=4, and M=2. To be specific, the network device configures the first uplink carrier and the second uplink carrier for the terminal device, a maximum number of four SRS resources is configured on the first uplink carrier, and a maximum number of four SRS resources is configured on the second uplink carrier. The network device configures eight SRS resources in total for the terminal device, that is, $N_{SRS}$=8. The network device indicates two of the SRS resources based on the first indication information. In this case, M is 2, and a maximum number of transmission layers for uplink transmission on the first uplink carrier and the second uplink carrier is 2.

In this case, the SRI field includes $\lceil \log_2(C_4^1+C_4^1)\rceil$ bits. Alternatively, the SRI field includes $\lceil \log_2(C_8^2-2*(C_4^1+C_4^2))\rceil$ bits.

It is assumed that the SRS resources whose indexes are 0, 1, 2, and 3 are configured on the first uplink carrier, and the SRS resources whose indexes are 4, 5, 6, and 7 are configured on the second uplink carrier. In response to the SRI indicating that SRS resource index combinations are 0/4, 0/5, 0/6, 0, 7, 1/4, 1/5, 1/6, 1/7, 2/4, 2/5, 2/6, 2/7, 3/4, 3/5, 3/6, and 3/7, the terminal device determines, based on the SRS resource index combinations, the first precoding used for data sending.

Example 2: An assumption is that p=4, q=2, and M=2. To be specific, the network device configures the first uplink carrier and the second uplink carrier for the terminal device, a maximum number of four SRS resources is configured on the first uplink carrier, and a maximum number of two SRS resources is configured on the second uplink carrier. The network device configures six SRS resources in total for the terminal device, that is, $N_{SRS}$=6. The network device indicates two of the SRS resources based on the first indication information. In this case, M is 2, and a maximum number of transmission layers for uplink transmission on the first uplink carrier and the second uplink carrier is 2.

Table 6.1 shows SRIs for non-codebook-based uplink transmission. As shown in Table 6.1, an assumption is that the SRS resources whose indexes are 0, 1, 2, and 3 are configured on the first uplink carrier, and the SRS resources whose indexes are 4 and 5 are configured on the second uplink carrier. In response to the SRI indicating that SRS resource index combinations are 0/4, 0/5, 1/4, 1/5, 2/4, 2/5, 3/4, and 3/5, the terminal device determines, based on the SRS resource index combinations, the first precoding used for data sending.

TABLE 6.1

| $N_{SRS}$ = 6, Lmax = 2 | |
|---|---|
| Bit field mapped to index | SRI(s), $N_{SRS}$ = 6 |
| 0 | 0 |
| 1 | 1 |
| 2 | 2 |
| 3 | 3 |
| 4 | 4 |
| 5 | 5 |
| 6 | 0, 1 |
| 7 | 0, 2 |
| 8 | 0, 3 |
| 9 | 0, 4 |
| 10 | 0, 5 |
| 11 | 1, 2 |

TABLE 6.1-continued $N_{SRS} = 6$, Lmax = 2

| Bit field mapped to index | SRI(s), $N_{SRS} = 6$ |
|---|---|
| 12 | 1, 3 |
| 13 | 1, 4 |
| 14 | 1, 5 |
| 15 | 2, 3 |
| 16 | 2, 4 |
| 17 | 2, 5 |
| 18 | 3, 4 |
| 19 | 3, 5 |
| 20 | 4, 5 |
| 21~31 | Reserved |

In response to the terminal device not supporting sending the uplink transmission on the SUL carriers through two SRS ports, in response to $N_{SRS}=6$, SRIs for non-codebook-based PUSCH transmission are shown in Table 6.2.

TABLE 6.2

$N_{SRS} = 6$, Lmax = 2

| Bit field mapped to index | SRI(s), $N_{SRS} = 6$ |
|---|---|
| 0 | 0 |
| 1 | 1 |
| 2 | 2 |
| 3 | 3 |
| 4 | 4 |
| 5 | 5 |
| 6 | 0, 1 |
| 7 | 0, 2 |
| 8 | 0, 3 |
| 9 | 0, 4 |
| 10 | 0, 5 |
| 11 | 1, 2 |
| 12 | 1, 3 |
| 13 | 1, 4 |
| 14 | 1, 5 |
| 15 | 2, 3 |
| 16 | 2, 4 |
| 17 | 2, 5 |
| 18 | 3, 4 |
| 19 | 3, 5 |
| 20~31 | Reserved |

Example 3: An assumption is that p=3, q=2, and M=2. To be specific, the network device configures the first uplink carrier and the second uplink carrier for the terminal device, a maximum number of three SRS resources is configured on the first uplink carrier, and a maximum number of two SRS resources is configured on the second uplink carrier. The network device configures five SRS resources in total for the terminal device, that is, $N_{SRS}=5$. The network device indicates two of the SRS resources based on the first indication information. In this case, M is 2, and a maximum number of transmission layers for uplink transmission on the first uplink carrier and the second uplink carrier is 2.

Table 7.1 shows SRIs for non-codebook-based uplink transmission. As shown in Table 7.1, an assumption is that the SRS resources whose indexes are 0, 1, and 2 are configured on the first uplink carrier, and the SRS resources whose indexes are 3 and 4 are configured on the second uplink carrier. In response to the SRI indicating that SRS resource index combinations are 0/3, 0/4, 1/3, 1/4, 2/3, and 2/4, the terminal device determines, based on the SRS resource index combinations, the first precoding used for data sending.

TABLE 7.1

$N_{SRS} = 5$, Lmax = 2

| Bit field mapped to index | SRI(s), $N_{SRS} = 5$ |
|---|---|
| 0 | 0 |
| 1 | 1 |
| 2 | 2 |
| 3 | 3 |
| 4 | 4 |
| 5 | 0, 1 |
| 6 | 0, 2 |
| 7 | 0, 3 |
| 8 | 0, 4 |
| 9 | 1, 2 |
| 10 | 1, 3 |
| 11 | 1, 4 |
| 12 | 2, 3 |
| 13 | 2, 4 |
| 14 | 3, 4 |
| 15 | Reserved |

In response to the terminal device not supporting sending the uplink transmission on the SUL carriers through two SRS ports, in response to $N_{SRS}=5$, SRIs for non-codebook-based PUSCH transmission are shown in Table 7.2.

TABLE 7.2

$N_{SRS} = 5$, Lmax = 2

| Bit field mapped to index | SRI(s), $N_{SRS} = 5$ |
|---|---|
| 0 | 0 |
| 1 | 1 |
| 2 | 2 |
| 3 | 3 |
| 4 | 4 |
| 5 | 0, 1 |
| 6 | 0, 2 |
| 7 | 0, 3 |
| 8 | 0, 4 |
| 9 | 1, 2 |
| 10 | 1, 3 |
| 11 | 1, 4 |
| 12 | 2, 3 |
| 13 | 2, 4 |
| 14-15 | Reserved |

Example 4: An assumption is that p=2, q=2, and M=2. To be specific, the network device configures the first uplink carrier and the second uplink carrier for the terminal device, two SRS resources are configured on the first uplink carrier, and two SRS resources are configured on the second uplink carrier. The network device configures four resources in total for the terminal device, that is, $N_{SRS}=4$. The network device indicates two of the SRS resources based on the first indication information. In this case, M is 2, and a maximum number of transmission layers for uplink transmission on the first uplink carrier and the second uplink carrier is 2.

Table 8.1 shows SRIs for non-codebook-based uplink transmission. As shown in Table 8.1, an assumption is that the SRS resources whose indexes are 0 and 1 are configured on the first uplink carrier, and the SRS resources whose indexes are 2 and 3 are configured on the second uplink carrier. In response to the SRI indicating that SRS resource index combinations are 0/2, 0/3, 1/2, and 1/3, the terminal device determines, based on the SRS resource index combinations, the first precoding used for data sending.

TABLE 8.1

$N_{SRS} = 4$, Lmax = 2

| Bit field mapped to index | SRI(s), $N_{SRS} = 4$ |
| --- | --- |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |
| 9 | 2, 3 |
| 10-15 | Reserved |

In response to the terminal device not supporting sending the uplink transmission on the SUL carriers through two SRS ports, in response to $N_{SRS}=4$, SRIs for non-codebook-based PUSCH transmission are shown in Table 8.2.

TABLE 8.2

$N_{SRS} = 4$, Lmax = 2

| Bit field mapped to index | SRI(s), $N_{SRS} = 4$ |
| --- | --- |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |

In response to the network device configuring at least two uplink carriers (for example, including the first uplink carrier and the second uplink carrier) for the terminal device to send (simultaneously transmit) the uplink transmission, x SRS resources are configured on the first uplink carrier, where x is a positive integer greater than 1, and one SRS resource is configured on the second uplink carrier. in response to only one SRS resource being configured on one of the at least two uplink carriers, a number of bits of an SRI field is not determined based on the uplink carrier on which only one SRS resource is configured. The number of bits of the SRI field is $\lceil \log_2 C_{x-1}^{M-1} \rceil$. Further, only one SRS resource is configured on y uplink carriers, and a number of 10 bits of the SRI field is $\lceil \log_2 C_{x-y}^{M-y} \rceil$. Details are described in Example 5 to Example 7.

Example 5: An assumption is that p=4, q=1, and M=2. To be specific, the network device configures the first uplink carrier and the second uplink carrier for the terminal device, four SRS resources are configured on the first uplink carrier, and one SRS resource is configured on the second uplink carrier. The network device configures five SRS resources in total for the terminal device, that is, $N_{SRS}=5$. The network device indicates two of the SRS resources based on the first indication information. In this case, M is 2, and a maximum number of transmission layers for uplink transmission on the first uplink carrier and the second uplink carrier is 2.

Table 9.1 shows SRIs for non-codebook-based uplink transmission. As shown in Table 9.1, an assumption is that the SRS resources whose indexes are 0, 1, 2, and 3 are configured on the first uplink carrier, and the SRS resource whose index is 4 is configured on the second uplink carrier. In response to the SRI indicating that SRS resource index combinations are 0/4, 1/4, 2/4, and 3/4, the terminal device determines, based on the SRS resource index combinations, the first precoding used for data sending.

TABLE 9.1

$N_{SRS} = 5$, Lmax = 2

| Bit field mapped to index | SRI(s), $N_{SRS} = 5$ |
| --- | --- |
| 0 | 0 |
| 1 | 1 |
| 2 | 2 |
| 3 | 3 |
| 4 | 0, 1 |
| 5 | 0, 2 |
| 6 | 0, 3 |
| 7 | 0, 4 |
| 8 | 1, 2 |
| 9 | 1, 3 |
| 10 | 1, 4 |
| 11 | 2, 3 |
| 12 | 2, 4 |
| 13 | 3, 4 |
| 14-15 | Reserved |

Because only one SRS resource is configured on the second uplink carrier, in response to the terminal device sending the uplink transmission through only one SRS port on the second uplink carrier, an SRI field in uplink grant signaling is 0 bits, so that a carrier indication field or a non-SUL/SUL indication field is used to indicate the terminal device to send the uplink transmission on a single carrier. Therefore, there is no code bit indicating a single SRS resource index of the second uplink carrier in the SRI table.

Example 6: An assumption is that p=3, q=1, and M=2. To be specific, the network device configures the first uplink carrier and the second uplink carrier for the network device, three SRS resources are configured on the first uplink carrier, and one SRS resource is configured on the second uplink carrier. The network device configures four resources in total for the terminal device, that is, $N_{SRS}=4$. The network device indicates two of the SRS resources based on the first indication information. In this case, M is 2, and a maximum number of transmission layers for uplink transmission on the first uplink carrier and the second uplink carrier is 2.

Table 10.1 and Table 10.2 each show SRIs for non-codebook-based uplink transmission. As shown in Table 10.1 and Table 10.2, an assumption is that the SRS resources whose indexes are 0, 1, and 2 are configured on the first uplink carrier, and the SRS resource whose index is 3 is configured on the second uplink carrier. In response to the SRI indicating that SRS resource index combinations are 0/3, 1/3, and 2/3, the terminal device determines, based on the SRS resource index combinations, the first precoding used for data sending.

TABLE 10.1

$N_{SRS} = 4$, Lmax = 2

| Bit field mapped to index | SRI(s), $N_{SRS} = 4$ |
| --- | --- |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |

TABLE 10.1-continued

| $N_{SRS}$ = 4, Lmax = 2 | |
|---|---|
| Bit field mapped to index | SRI(s), $N_{SRS}$ = 4 |
| 9 | 2, 3 |
| 10-15 | Reserved |

TABLE 10.2

| $N_{SRS}$ = 4, Lmax = 2 | |
|---|---|
| Bit field mapped to index | SRI(s), $N_{SRS}$ = 4 |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |

Example 7: An assumption is that p=2, q=1, and M=2. To be specific, the network device configures the first uplink carrier and the second uplink carrier for the terminal device, two SRS resources are configured on the first uplink carrier, and one SRS resource is configured on the second uplink carrier. The network device configures three resources in total for the terminal device, that is, $N_{SRS}$=3. The network device indicates two of the SRS resources based on the first indication information. In this case, M is 2, and a maximum number of transmission layers for uplink transmission on the first uplink carrier and the second uplink carrier is 2.

Table 11.1 shows SRIs for non-codebook-based uplink transmission. As shown in Table 11.1, an assumption is that the SRS resources whose indexes are 0 and 1 are configured on the first uplink carrier, and the SRS resource whose index is 2 is configured on the second uplink carrier. In response to the SRI indicating that SRS resource index combinations are 0/2 and 1/2, the terminal device determines, based on the SRS resource index combinations, the first precoding used for data sending.

TABLE 11.1

| $N_{SRS}$ = 3, Lmax = 2 | |
|---|---|
| Bit field mapped to index | SRI(s), $N_{SRS}$ = 3 |
| 0 | 0 |
| 1 | 1 |
| 2 | 2 |
| 3 | 0, 1 |
| 4 | 0, 2 |
| 5 | 1, 2 |
| 6-7 | Reserved |

Example 8: An assumption is that p=4, q=2, and M=3. To be specific, the network device configures the first uplink carrier and the second uplink carrier for the terminal device, four SRS resources are configured on the first uplink carrier, and two SRS resources are configured on the second uplink carrier. The network device configures six resources in total for the terminal device, that is, $N_{SRS}$=6. The network device indicates three of the SRS resources based on the first indication information. In this case, M is 3, and a maximum number of transmission layers for uplink transmission on the first uplink carrier and the second uplink carrier is 3. Table 12.1 shows SRIs for non-codebook-based uplink transmission. As shown in Table 12.1, an assumption is that SRS resources whose indexes are 0, 1, 2, and 3 are configured on the first uplink carrier, and SRS resources whose indexes are 4 and 5 are configured on the second uplink carrier. In response to the SRI indicating that SRS resource index combinations are 0, 1, 4; 0, 1, 5; 0, 2, 4; 0, 2, 5; 0, 3, 4; 0, 3, 5; 1, 2, 4; 1, 2, 5; 1, 3, 4; 1, 3, 5; 2, 3, 4; and 2, 3, 5, the terminal device determines, based on these SRS resource index combinations, the first precoding used for data sending.

TABLE 12.1

| $N_{SRS}$ = 6, Lmax = 3 | |
|---|---|
| Bit field mapped to index | SRI(s), $N_{SRS}$ = 6 |
| 0 | 0 |
| 1 | 1 |
| 2 | 2 |
| 3 | 3 |
| 4 | 4 |
| 5 | 5 |
| 6 | 0, 1 |
| 7 | 0, 2 |
| 8 | 0, 3 |
| 9 | 0, 4 |
| 10 | 0, 5 |
| 11 | 1, 2 |
| 12 | 1, 3 |
| 13 | 1, 4 |
| 14 | 1, 5 |
| 15 | 2, 3 |
| 16 | 2, 4 |
| 17 | 2, 5 |
| 18 | 3, 4 |
| 19 | 3, 5 |
| 20 | 4, 5 |
| 21 | 0, 1, 2 |
| 22 | 0, 1, 3 |
| 23 | 0, 1, 4 |
| 24 | 0, 1, 5 |
| 25 | 0, 2, 3 |
| 26 | 0, 2, 4 |
| 27 | 0, 2, 5 |
| 28 | 0, 3, 4 |
| 29 | 0, 3, 5 |
| 30 | 0, 4, 5 |
| 31 | 1, 2, 3 |
| 32 | 1, 2, 4 |
| 33 | 1, 2, 5 |
| 34 | 1, 3, 4 |
| 35 | 1, 3, 5 |
| 36 | 1, 4, 5 |
| 37 | 2, 3, 4 |
| 38 | 2, 3, 5 |
| 39 | 2, 4, 5 |
| 40 | 3, 4, 5 |
| 41~63 | Reserved |

In response to the SRI indicating that SRS resource index combinations are 0/4/5, 1/4/5, 2/4/5, and 3/4/5, a PUSCH is simultaneously transmitted on the first uplink carrier through an antenna port and on the second uplink carrier through two antenna ports. The network device indicates the UE to perform simultaneous transmission on two carriers, where a maximum number of layers is 3. A table of SRIs for non-codebook-based PUSCH transmission is a subset of Table 12.1.

Example 9: An assumption is that p=4, q=1, and M=3. To be specific, the network device configures the first uplink carrier and the second uplink carrier for the terminal device, four SRS resources are configured on the first uplink carrier, and one SRS resource is configured on the second uplink carrier. The network device configures five resources in total for the terminal device, that is, $N_{SRS}=5$. The network device indicates three of the SRS resources based on the first indication information. In this case, M is 3, and a maximum number of transmission layers for uplink transmission on the first uplink carrier and the second uplink carrier is 3.

Table 13.1 shows SRIs for non-codebook-based uplink transmission. As shown in Table 13.1, an assumption is that the SRS resources whose indexes are 0, 1, 2, and 3 are configured on the first uplink carrier, and the SRS resources whose index is 4 is configured on the second uplink carrier. In response to the SRI indicating that SRS resource index combinations are 0, 1, 4; 0, 2, 4; 0, 3, 4; 1, 2, 4; 1, 3, 4; and 2, 3, 4, the terminal device determines, based on the SRS resource index combinations, the first precoding used for data sending.

The network device indicates the terminal device to perform simultaneous transmission on two uplink carriers, where a maximum number of layers is 3. A table of SRIs for non-codebook-based uplink transmission is a subset of Table 13.1.

TABLE 13.1

$N_{SRS} = 5$, Lmax = 3

| Bit field mapped to index | SRI(s), $N_{SRS} = 5$ |
|---|---|
| 0 | 0 |
| 1 | 1 |
| 2 | 2 |
| 3 | 3 |
| 4 | 4 |
| 5 | 0, 1 |
| 6 | 0, 2 |
| 7 | 0, 3 |
| 8 | 0, 4 |
| 9 | 1, 2 |
| 10 | 1, 3 |
| 11 | 1, 4 |
| 12 | 2, 3 |
| 13 | 2, 4 |
| 14 | 3, 4 |
| 15 | 0, 1, 2 |
| 16 | 0, 1, 3 |
| 17 | 0, 1, 4 |
| 18 | 0, 2, 3 |
| 19 | 0, 2, 4 |
| 20 | 0, 3, 4 |
| 21 | 1, 2, 3 |
| 22 | 1, 2, 4 |
| 23 | 1, 3, 4 |
| 24 | 2, 3, 4 |
| 25~31 | Reserved |

Alternatively, in response to the network device configuring only one SRS resource for the second uplink carrier, and configures simultaneous PUSCH transmission on the first uplink carrier and the second uplink carrier, in response to a number of SRS resources configured on the first uplink carrier being greater than 1, an SRI field in uplink grant signaling indicates only an SRS resource that is on the first uplink carrier and that is applied to PUSCH transmission.

Example 10: An assumption is that p=4, q=1, o=1, and M=4. To be specific, the network device configures the first uplink carrier, the second uplink carrier, and the third uplink carrier for the terminal device, four SRS resources are configured on the first uplink carrier, two SRS resources are configured on the second uplink carrier, and two SRS resources are configured on the third uplink carrier. The network device configures eight resources in total for the terminal device, that is, $N_{SRS}=8$. The network device indicates four of the SRS resources based on the first indication information. In this case, M is 4, and a maximum number of transmission layers for uplink transmission on the first uplink carrier and the second uplink carrier is 4.

Table 14.1 shows SRIs for non-codebook-based uplink transmission. As shown in Table 14.1, an assumption is that the SRS resources whose indexes are 0, 1, 2, and 3 are configured on the first uplink carrier, the SRS resources whose indexes are 4 and 5 are configured on the second uplink carrier, and the SRS resources whose indexes are 6 and 7 are configured on the third uplink carrier. To implement simultaneous PUSCH transmission on the first uplink carrier through two SRS ports, on the second uplink carrier through one SRS port, and on the third uplink carrier through one SRS port, the SRIs for non-codebook-based simultaneous uplink transmission are shown in Table 14.1. Alternatively, the network device indicates the terminal device to perform simultaneous transmission on three uplink carriers, where an SRS port combination is 2+1+1 and a maximum number of transmission layers is 4. A table of SRIs for non-codebook-based simultaneous PUSCH transmission is a subset of Table 14.1.

TABLE 14.1

$N_{SRS} = 8$, Lmax = 4

| Bit field mapped to index | SRI(s), $N_{SRS} = 8$ |
|---|---|
| 0 | 0, 1, 4, 6 |
| 1 | 0, 1, 5, 6 |
| 2 | 0, 1, 4, 7 |
| 3 | 0, 1, 5, 7 |
| 4 | 0, 2, 4, 6 |
| 5 | 0, 2, 5, 6 |
| 6 | 0, 2, 4, 7 |
| 7 | 0, 2, 5, 7 |
| 8 | 0, 3, 4, 6 |
| 9 | 0, 3, 5, 6 |
| 10 | 0, 3, 4, 7 |
| 11 | 0, 3, 5, 7 |
| 12 | 1, 2, 4, 6 |
| 13 | 1, 2, 5, 6 |
| 14 | 1, 2, 4, 7 |
| 15 | 1, 2, 5, 7 |
| 16 | 1, 3, 4, 6 |
| 17 | 1, 3, 5, 6 |
| 18 | 1, 3, 4, 7 |
| 19 | 1, 3, 5, 7 |
| 20 | 2, 3, 4, 6 |
| 21 | 2, 3, 5, 6 |
| 22 | 2, 3, 4, 7 |
| 23 | 2, 3, 5, 7 |
| 24-31 | Reserved |

2. Codebook-Based Uplink Transmission.

The first indication information further indicates first precoding used for data sending. The first precoding includes precoding that is used for data sending and that is on the first uplink carrier and precoding that is used for data sending and that is on the second uplink carrier. In other words, the first precoding is understood as a set of precoding, which includes precoding on each of the at least two uplink carriers. Certainly, the first precoding is alternatively understood as joint precoding generated based on precoding that is used for data sending and that is on each uplink carrier.

For example, the first indication information is a TPMI. The at least two uplink carriers include one SUL carrier and one NUL carrier. The TPMI indicates the terminal device to perform simultaneous uplink transmission on the NUL carrier by using precoding A applying to two layers and on the SUL carrier by using precoding B applying to one layer. The two layers correspond to two SRS ports indicated by the SRI. The one layer corresponds to two SRS ports indicated by the SRI. Therefore, the first precoding includes the precoding A and the precoding B, and the first precoding is as follows:

$$\begin{bmatrix} A & 0 \\ 0 & B \end{bmatrix}$$

$$A = \begin{bmatrix} a_1 & a_2 \\ a_3 & a_4 \end{bmatrix}, \text{ and } B = \begin{bmatrix} b_1 \\ b_2 \end{bmatrix}.$$

In addition, the first precoding corresponds to at least one precoding matrix, and precoding that is on each uplink carrier and that is used for data sending corresponds to one precoding matrix. Further, in response to the first precoding corresponding to one precoding matrix, the at least two uplink carriers correspond to one precoding matrix. Alternatively, in response to the first precoding corresponding to a plurality of precoding matrices, the at least two uplink carriers correspond to a plurality of precoding matrices.

Optionally, the first indication information further indicates a number of transmission layers corresponding to uplink transmission. A number of transmission layers corresponding to the first precoding is a sum of a number of transmission layers for uplink transmission on the first uplink carrier and a number of transmission layers for uplink transmission on the second uplink carrier.

S702: The terminal device sends the uplink transmission on the at least two uplink carriers based on the first indication information.

The uplink transmission includes sending of an uplink DMRS and/or uplink data. A receiving end performs independent channel estimation on different uplink transmissions, to demodulate and decode the uplink data. The uplink data includes valid information and redundant information, and the uplink data is carried on a PUSCH.

There is at least one uplink transmission, and the at least one uplink transmission includes first uplink transmission and/or second uplink transmission. Specifically, the uplink transmission is one uplink transmission. In this case, one uplink transmission is sent on the at least two uplink carriers. Alternatively, the uplink transmission is a plurality of uplink transmissions. In this case, a plurality of different uplink transmissions are sent on the at least two uplink carriers.

S702 is specifically implemented as follows: The terminal device sends the first uplink transmission on the at least two uplink carriers based on the first indication information.

It should be understood that, in this case, one uplink transmission is sent on the at least two uplink carriers. That the at least two uplink carriers include a first uplink carrier and a second uplink carrier is used as an example. The uplink transmission on the first uplink carrier and the uplink transmission on the second uplink carrier belong to a transport block (Transport Block, TB). The terminal device maps some bits in the TB to the first uplink carrier, and maps the remaining bits in the TB to the second uplink carrier. In other words, some resource blocks (Resource Blocks, RBs) used to bear uplink transmission are on the first uplink carrier, and the remaining RBs are on the second uplink carrier. In this case, a part of the TB mapped to the first uplink carrier includes at least one code block group (Code Block Group, CBG), a remaining part of the TB mapped to the second uplink carrier also includes at least one code block group CBG. The CBG related to the first uplink carrier is different from the CBG related to the second uplink carrier.

For example, the first uplink transmission is an uplink shared channel PUSCH, an uplink control channel (physical uplink control channel, PUCCH), a sounding reference signal SRS, or an uplink random access channel (physical random access channel, PRACH).

In another implementation, the terminal device sends, based on the first indication information, the first uplink transmission on the first uplink carrier of the at least two uplink carriers, and sends the second uplink transmission on the second uplink carrier of the at least two uplink carriers.

It should be understood that, in this case, a plurality of uplink transmissions are sent on the at least two uplink carriers. That the at least two uplink carriers include a first uplink carrier and a second uplink carrier is used as an example. The first uplink transmission on the first uplink carrier and the second uplink transmission on the second uplink carrier are (belong to) two transport blocks TB s that are independent of each other. The terminal device maps the first uplink transmission (a first TB) to the first uplink carrier, and maps the second uplink transmission (a second TB) to the second uplink carrier. In other words, a resource block RB used to bear the first uplink transmission is on the first uplink carrier, and an RB used to bear the second uplink transmission is on the second uplink carrier.

For example, the terminal device sends a PUSCH on the first uplink carrier, and sends a PUCCH on the second uplink carrier. Alternatively, the terminal device sends a PUSCH on the first uplink carrier, and sends a PRACH on the second uplink carrier. Alternatively, the terminal device sends a PUSCH on the first uplink carrier, and sends an SRS on the second uplink carrier. Alternatively, the terminal device sends a PUCCH on the first uplink carrier, and sends an SRS on the second uplink carrier. Alternatively, the terminal device sends a PUCCH on the first uplink carrier, and sends a PRACH on the second uplink carrier. Alternatively, the terminal device sends a PRACH on the first uplink carrier, and sends an SRS on the second uplink carrier.

In addition, for example, in response to uplink transmission being performed simultaneously on three uplink carriers, the network device allocates two radio frequency chains, that is, two SRS ports, to the first uplink carrier, and allocates one radio frequency chain, that is, one SRS port, to each of the second uplink carrier and the third uplink carrier. The terminal device performs simultaneous transmission on the three uplink carriers through four SRS ports.

Figure 8:
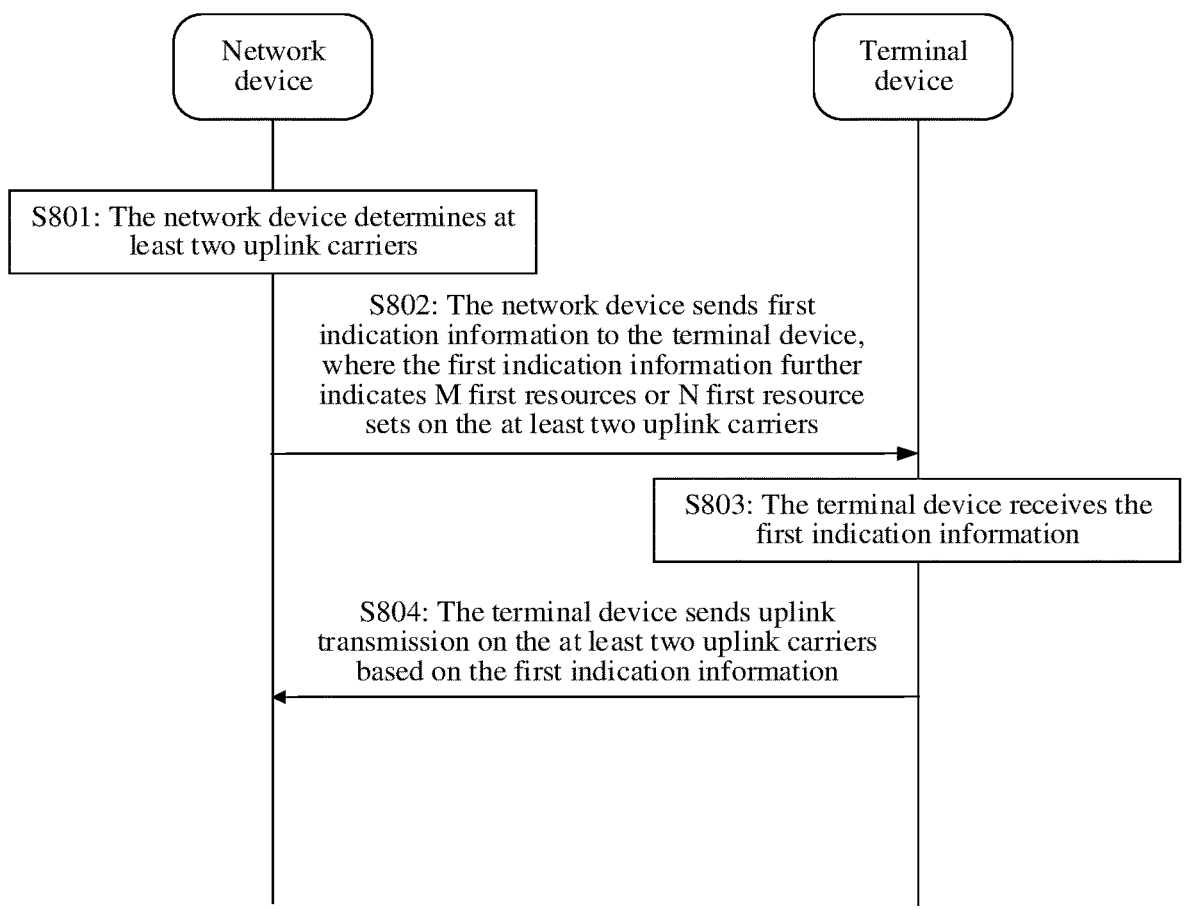
FIG. 8 is a schematic flowchart of another uplink transmission method according to at least one embodiment.

FIG. 8 is a schematic flowchart of another uplink transmission method according to at least one embodiment. As shown in FIG. 8, non-codebook-based uplink transmission is performed. The uplink transmission method includes the following steps:

S801: A network device determines at least two uplink carriers.

The at least two uplink carriers include a first uplink carrier and a second uplink carrier.

S802: The network device sends first indication information to a terminal device, where the first indication information further indicates M first resources or N first resource sets on the at least two uplink carriers.

The M first resources is M SRS resources, and the N first resource sets is sets of any combination of SRS resources on the at least two uplink carriers.

Further, the first indication information further includes a first power parameter and a second power parameter. The first power parameter corresponds to a first transmission power of uplink transmission on a first uplink carrier of the at least two uplink carriers, and the second power parameter corresponds to a second transmission power of uplink transmission on a second uplink carrier of the at least two uplink carriers. In other words, the first indication information indicates the at least two uplink carriers and transmission powers corresponding to each of the uplink carriers. Transmission powers corresponding to each of the at least two uplink carriers are independent of each other. This avoids a problem that determining of a transmission power of the uplink transmission is affected because different maximum power reductions are caused by different frequency domain resource allocations on different carriers.

In an implementation, the network device preconfigures/defines a correspondence between the first power parameter and the first transmission power on the first uplink carrier and a correspondence between the second power parameter and the second transmission power on the second uplink carrier. In this case, the network device separately indicates the transmission power on the first uplink carrier and the transmission power on the second uplink carrier by using a "transmission power control command for scheduled uplink transmission" (TPC command for scheduled PUSCH) field in uplink grant signaling.

Alternatively, in another implementation, the first transmission power on the first uplink carrier and the second transmission power on the second uplink carrier are configured by using SRI parameters. For example, one SRI code bit corresponds to two sets of open loop power control parameters (P0, alpha) respectively corresponding to two uplink carriers. The terminal device receives the SRI parameter sent by the network device, and determines the first transmission power on the first uplink carrier and the second transmission power on the second uplink carrier based on the SRI parameter.

In this way, powers corresponding to uplink transmission transmitted on the at least two uplink carriers is different. This avoids a problem that determining of a transmission power of the uplink transmission is affected because different maximum power decrements (Maximum Power Reduction, MPR) are caused by different frequency domain resource allocations on the two uplink carriers.

S803: The terminal device receives the first indication information.

S804: The terminal device sends the uplink transmission on the at least two uplink carriers based on the first indication information.

S803 and S804 are similar to S701 and S702. For details, refer to related descriptions in S701 and S702.

Figure 9:
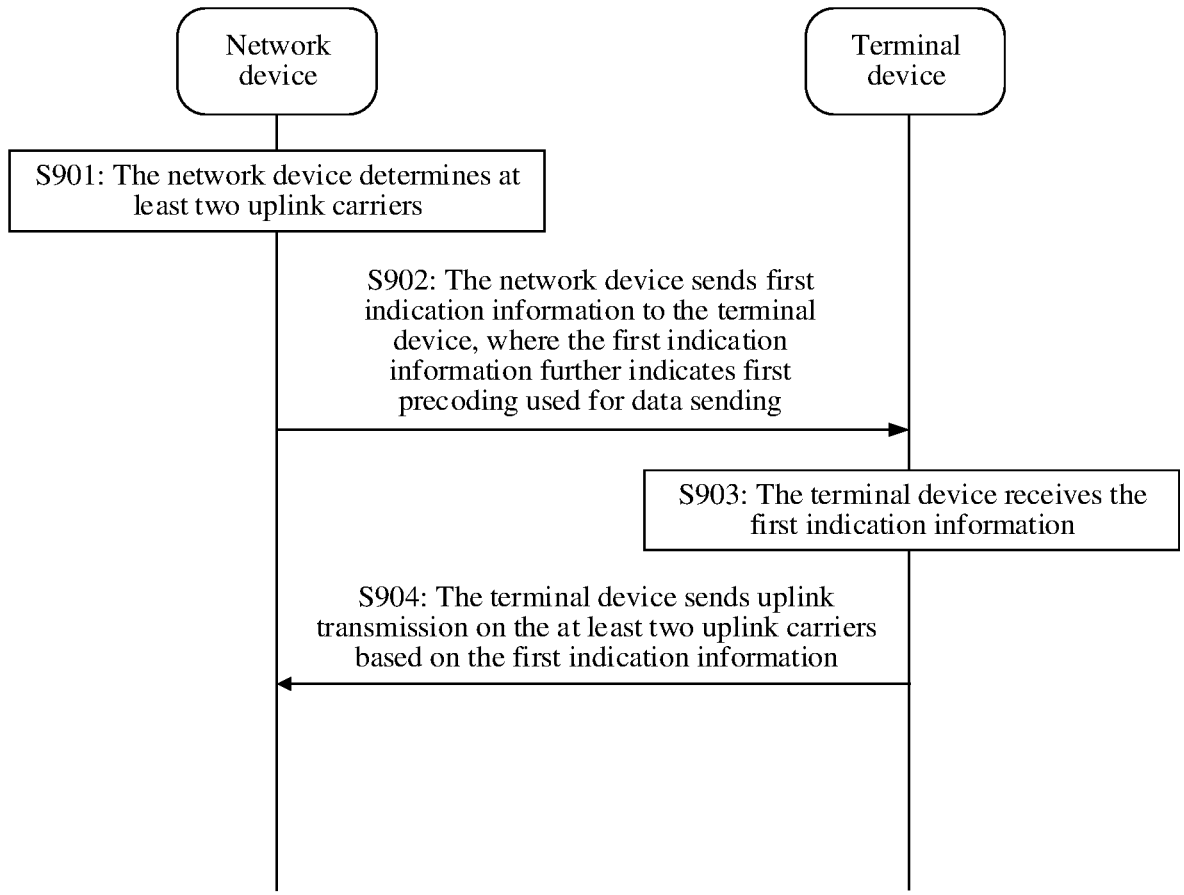
FIG. 9 is a schematic flowchart of another uplink transmission method according to at least one embodiment.

FIG. 9 is a schematic flowchart of still another uplink transmission method according to at least one embodiment. As shown in FIG. 9, codebook-based uplink transmission is performed. The uplink transmission method includes the following steps:

S901: A network device determines at least two uplink carriers.

The at least two uplink carriers include a first uplink carrier and a second uplink carrier.

S902: The network device sends first indication information to a terminal device, where the first indication information further indicates first precoding used for data sending.

The first precoding includes precoding that is used for data sending and that is on the first uplink carrier and precoding that is used for data sending and that is on the second uplink carrier.

Further, the first indication information further includes a first power parameter and a second power parameter. The first power parameter corresponds to first transmission power of uplink transmission on the first uplink carrier of the at least two uplink carriers, and the second power parameter corresponds to second transmission power of uplink transmission on the second uplink carrier of the at least two uplink carriers. In other words, the first indication information indicates the at least two uplink carriers and transmission powers corresponding to each of the uplink carriers. Transmission powers corresponding to each of the at least two uplink carriers are independent of each other. This avoids a problem that determining of a transmission power of the uplink transmission is affected because different maximum power reductions caused by different frequency domain resource allocations on different carriers.

For a specific implementation, refer to the foregoing related content. Details are not described herein again.

S903: The terminal device receives the first indication information.

S904: The terminal device sends the uplink transmission on the at least two uplink carriers based on the first indication information.

S903 and S904 are similar to S701 and S702. For details, refer to related descriptions in S701 and S702.

The solutions in the foregoing embodiments are able to be combined on a premise that the solutions are not contradictory.

The foregoing mainly describes the solutions in at least one embodiment from the perspective of interaction between network elements. To implement the foregoing functions, the network elements such as the network device and the terminal device include at least one of corresponding hardware structures and software modules for performing the functions. A person skilled in the art should easily be aware that, in combination with units and algorithm steps of the examples described in embodiments disclosed in this specification, embodiment described herein are implemented by hardware or a combination of hardware and computer software. Whether a function is performed by hardware or hardware driven by computer software depends on particular applications and design constraints of the technical solutions. A person skilled in the art uses different methods to implement the described functions for each particular application, but the implementation does not goes beyond the scope of embodiments described herein.

In at least one embodiment, the network device and the terminal device is divided into function units based on the method examples. For example, each function unit is obtained through division based on each corresponding function, or two or more functions is integrated into one processing unit. The integrated unit is implemented in a form of hardware, or is implemented in a form of a software functional unit. In at least one embodiment, division into the units is an example, and is merely a logical function division. During actual implementation, another division manner is used.

Figure 10:
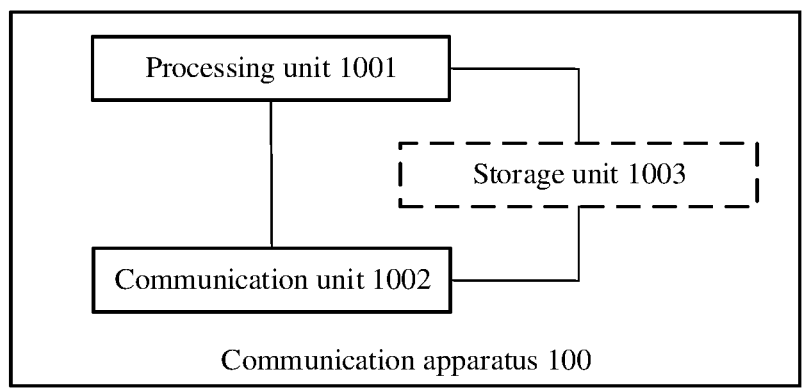
FIG. 10 is a schematic diagram of a structure of a communication apparatus according to at least one embodiment.

In response to an integrated unit being used, FIG. 10 is a schematic diagram of a structure of a communication apparatus (denoted as a communication apparatus 100) in the foregoing embodiments. The communication apparatus 100 includes a processing unit 1001 and a communication unit 1002, and further includes a storage unit 1003. The schematic diagram of the structure shown in FIG. 10 is used to show structures of the network device and the terminal device in the foregoing embodiments.

In response to the schematic diagram of the structure shown in FIG. 10 being used to show the structure of the terminal device in the foregoing embodiments, the processing unit 1001 is configured to control and manage an action of the terminal device, for example, control the terminal device to perform S701 and S702 in FIGS. 7, S803 and S804 in FIGS. 8, S903 and S904 in FIGS. 9, S1003 and S1004 in FIG. 10, and/or an action performed by the terminal device in another process described in at least one embodiment. The processing unit 1001 communicates with another network entity by using the communication unit 1002, for example, communicate with the network device shown in FIG. 1 to FIG. 3. The storage unit 1003 is configured to store program code and data of the terminal device.

In response to the schematic diagram of the structure shown in FIG. 10 being used to show the structure of the terminal device in the foregoing embodiments, the communication apparatus 100 is a terminal device, or is a chip in the terminal device.

In response to the schematic diagram of the structure shown in FIG. 10 being used to show the structure of the network device in the foregoing embodiments, the processing unit 1001 is configured to control and manage an action of the network device, for example, control the network device to perform S801 and S802 in FIGS. 8, S901 and S902 in FIGS. 9, S1001 and S1002 in FIG. 10, and/or an action performed by the terminal device in another process described in at least one embodiment. The processing unit 1001 communicates with another network entity by using the communication unit 1002, for example, communicate with the terminal device shown in FIG. 1 to FIG. 3. The storage unit 1003 is configured to store program code and data of the network device.

In response to the schematic diagram of the structure shown in FIG. 10 being used to show the structure of the network device in the foregoing embodiments, the communication apparatus 100 is a network device, or is a chip in the network device.

In response to the communication apparatus 100 being the terminal device or the network device, the processing unit 1001 is a processor or a controller, and the communication unit 1002 is a communication interface, a transceiver, a transceiver device, a transceiver circuit, a transceiver apparatus, or the like. The communication interface is a general term, and includes one or more interfaces. The storage unit 1003 is a memory. In response to the communication apparatus 100 being the chip in the terminal device or the network device, the processing unit 1001 is a processor or a controller, and the communication unit 1002 is an input interface and/or an output interface, a pin, a circuit, or the like. The storage unit 1003 is a storage unit (for example, a register or a cache) in the chip, or is a storage unit (for example, a read-only memory (read-only memory, ROM for short) or a random access memory (random access memory, RAM for short)) that is in the terminal device or the network device and that is located outside the chip.

The communication unit is also referred to as a transceiver unit. An antenna and a control circuit that have receiving and sending functions in the communication apparatus 100 is considered as the communication unit 1002 of the communication apparatus 100, and a processor that has a processing function is considered as the processing unit 1001 of the communication apparatus 100. Optionally, a component configured to implement a receiving function in the communication unit 1002 is considered as a receiving unit. The receiving unit is configured to perform a receiving step in at least one embodiment. The receiving unit is a receiver machine, a receiver, a receiver circuit, or the like.

In an implementation process, the steps in the methods provided in the embodiments is completed by using a hardware integrated logic circuit in the processor, or by using instructions in a form of software. The steps of the methods disclosed with reference to at least one embodiment are directly implemented by a hardware processor, or are implemented by a combination of hardware and a software module in a processor.

The processor in at least one embodiment includes but is not limited to at least one of the following types: a central processing unit (central processing unit, CPU), a microprocessor, a digital signal processor (DSP), a microcontroller unit (microcontroller unit, MCU), or a computing device used for running software like an artificial intelligence processor. Each computing device includes one or more cores used to execute software instructions to perform operations or processing. The processor is an independent semiconductor chip, or is integrated with another circuit into a semiconductor chip. For example, the processor may form a SoC (system-on-a-chip) with another circuit (such as a codec circuit, a hardware acceleration circuit, or various buses and interface circuits). Alternatively, the processor is integrated into an ASIC as a built-in processor of the ASIC, and the ASIC integrated with the processor is separately packaged, or is packaged with another circuit. In addition to the core configured to execute software instructions to perform the operation or processing, the processor further includes a necessary hardware accelerator, for example, a field programmable gate array (field programmable gate array, FPGA), a PLD (programmable logic device), or a logic circuit that implements a dedicated logic operation.

The memory in at least one embodiment includes at least one of the following types: a read-only memory (read-only memory, ROM) or another type of static storage device that stores static information and instructions, a random access memory (random access memory, RAM) or another type of dynamic storage device that stores information and instructions, or an electrically erasable programmable read-only memory (Electrically erasable programmable read-only memory, EEPROM). In some scenarios, the memory is alternatively a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that is used to carry or store expected program code in a form of an instruction or a data structure and that is accessed by a computer. However, the memory is not limited thereto.

At least one embodiment further provides a computer-readable storage medium. The computer-readable storage medium stores instructions. In response to the instructions being run on a computer, the computer is enabled to perform the method according to any one of the foregoing embodiments.

At least one embodiment further provides a computer program product. In response to the computer program product running on a computer, the computer is enabled to perform the method in any one of the foregoing embodiments.

At least one embodiment further provides a communication apparatus. The apparatus exists in a product form of a chip. A structure of the apparatus includes a processor and an interface circuit. The processor is configured to communicate with another apparatus through a receiving circuit, to enable the apparatus to perform the method in any one of the foregoing embodiments.

At least one embodiment further provides a communication system, including the foregoing network device and the foregoing terminal device.

At least one embodiment further provides a chip. The chip includes a processor and an interface circuit. The interface circuit is coupled to the processor. The processor is configured to run a computer program or instructions, to implement the foregoing methods. The interface circuit is used to communicate with another module outside the chip.

Although at least embodiment is described with reference to specific features and embodiments thereof, various modifications and combinations are able to be made to them without departing from the spirit and scope of embodiments described herein. Correspondingly, the specification and accompanying drawings are merely example description of embodiments defined by the appended claims, and are considered as any of or all modifications, variations, combinations or equivalents that cover the scope of embodiments described herein. A person skilled in the art is able to make various modifications and variations to embodiments described herein without departing from the spirit and scope of embodiments described herein. At least one embodiment is intended to cover these modifications and variations of embodiments described herein provided that they fall within the scope of the claims of embodiments described herein and equivalent technologies thereof.

The foregoing descriptions are merely specific implementations of embodiments described herein, but are not intended to limit the protection scope of embodiments described herein. Any variation or replacement readily figured out by a person skilled in the art within the technical scope disclosed in at least one embodiment shall fall within the protection scope of embodiments described herein. Therefore, the protection scope of embodiments described herein shall be subject to the protection scope of the claims.

What is claimed is:

1. An uplink transmission method, comprising:
   receiving first indication information, wherein the first indication information indicates at least two uplink carriers; and
   sending uplink transmission on the at least two uplink carriers based on the first indication information,
   wherein the receiving includes receiving the first indication information further indicates M first resources or N first resource sets on the at least two uplink carriers,
   M is a positive integer greater than or equal to 2, and
   N is a positive integer greater than or equal to 1;
   determining, based on the M first resources or the N first resource sets,
   first precoding used for data sending,
   wherein the receiving the first indication information indicating
   M first resources or N first resource sets on the at least two uplink carriers include receiving the first indication information indication
   the M first resources or the N first resource sets on a first uplink carrier and
   a second uplink carrier; and
   wherein the M first resources or the N first resource sets includes P first resources on the first uplink carrier and
   Q first resources on the second uplink carrier,
   wherein both P and Q are integers greater than or equal to 1.

2. The method according to claim 1, wherein the receiving a first uplink carrier and a second uplink carrier, the first indication information further indicates first precoding used for data sending, and the first precoding includes precoding that is used for data sending on the first uplink carrier and precoding that is used for data sending on the second uplink carrier.

3. The method according to claim 1, wherein the uplink transmission includes first uplink transmission and/or second uplink transmission; and
   the sending the uplink transmission on the at least two uplink carriers based on the first indication information includes:
   sending based on the first indication information, the first uplink transmission on the first uplink carrier of the at least two uplink carriers, and sending the second uplink transmission on the second uplink carrier of the at least two uplink carriers.

4. The method according to claim 1, wherein
   the receiving, by the terminal device, the first indication information further includes receiving a first power parameter and a second power parameter, wherein the first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

5. An uplink transmission method, comprising:
   determining, by a network device, at least two uplink carriers; and
   sending, by the network device, first indication information used to indicate to send uplink transmission on the at least two uplink carriers,
   wherein the sending, by the network device, the first indication information used to indicate to send the uplink transmission on the at least two uplink carriers includes sending,
   on the at least two uplink carriers, the first indication information used to indicate to determine,
   based on M first resources or N first resource sets,
   first precoding used for data sending,
   wherein M is a positive integer greater than or equal to 2, and
   N is a positive integer greater than or equal to 1,
   wherein the sending, by the network device, the first indication information used to indicate to send the uplink transmission on the at least two uplink carriers include
   sending the first indication information used to indicate to use a first uplink carrier and
   a second uplink carrier; and
   the M first resources or the N first resource sets includes P first resources on the first uplink carrier and
   Q first resources on the second uplink carrier,
   wherein both P and Q are integers greater than or equal to 1.

6. The method according to claim 5, wherein the sending, by the network device, the first indication information used to indicate to send the uplink transmission on the at least two uplink carriers includes sending the first indication information used to indicate to send the uplink transmission on a first uplink carrier and a second uplink carrier, the first indication information further indicates first precoding used for data sending, and the first precoding includes precoding that is used for data sending on the first uplink carrier and precoding that is used for data sending on the second uplink carrier.

7. A communications apparatus, comprising:
   a memory storing a computer program; and
   one or more processors connected to the memory, wherein the processor is configured to execute the computer program to perform operations for:

receiving first indication information, wherein the first indication information indicates at least two uplink carriers; and sending uplink transmission on the at least two uplink carriers based on the first indication information, wherein the first indication information further indicates M first resources or N first resource sets on the at least two uplink carriers, M is a positive integer greater than or equal to 2, and N is a positive integer greater than or equal to 1; and wherein the one or more processors are further configured for:

determining based on the M first resources or the N first resource sets, first precoding used for data sending, wherein the at least two uplink carriers include a first uplink carrier and a second uplink carrier; and the M first resources or the N first resource sets includes P first resources on the first uplink carrier and Q first resources on the second uplink carrier, wherein both P and Q are integers greater than or equal to 1.

8. The apparatus according to claim 7, wherein the at least two uplink carriers includes a first uplink carrier and a second uplink carrier, the first indication information further indicates first precoding used for data sending, and the first precoding includes precoding that is used for data sending on the first uplink carrier and precoding that is used for data sending on the second uplink carrier.

9. The apparatus according to claim 7, wherein the uplink transmission includes first uplink transmission and/or second uplink transmission; and wherein the one or more processors send the uplink transmission on the at least two uplink carriers based on the first indication information by:

sending based on the first indication information, the first uplink transmission on the first uplink carrier of the at least two uplink carriers, and sending the second uplink transmission on the second uplink carrier of the at least two uplink carriers.

10. The apparatus according to claim 7, wherein the first indication information further includes a first power parameter and a second power parameter, wherein the first power parameter corresponds to a first transmission power of the uplink transmission on the first uplink carrier of the at least two uplink carriers, and the second power parameter corresponds to a second transmission power of the uplink transmission on the second uplink carrier of the at least two uplink carriers.

11. A communications apparatus, comprising:

a memory storing a computer program; and one or more processors one or more processors connected to the memory, wherein the processor is configured to execute operations for:

determining at least two uplink carriers; and sending first indication information, wherein the first indication information indicates to send uplink transmission on the at least two uplink carriers, wherein the first indication information further indicates to determine, based on M first resources or N first resource sets on the at least two uplink carriers, first precoding used for data sending, wherein M is a positive integer greater than or equal to 2, and N is a positive integer greater than or equal to 1.

wherein the at least two uplink carriers include a first uplink carrier and a second uplink carrier; and the M first resources or the N first resource sets includes P first resources on the first uplink carrier and Q first resources on the second uplink carrier, wherein both P and Q are integers greater than or equal to 1.

12. The apparatus according to claim 11, wherein the at least two uplink carriers includes a first uplink carrier and a second uplink carrier, the first indication information further indicates first precoding used for data sending, and the first precoding includes precoding that is used for data sending on the first uplink carrier and precoding that is used for data sending on the second uplink carrier.

* * * * *